(12) United States Patent  
Padaki et al.

(10) Patent No.: US 10,585,786 B1  
(45) Date of Patent: Mar. 10, 2020

(54) SYSTEMS AND METHOD FOR AUTOMATED TESTING FRAMEWORK FOR SERVICE PORTAL CATALOG

(71) Applicant: ServiceNow, Inc., Santa Clara, CA (US)

(72) Inventors: Bharath Padaki, San Diego, CA (US); Shouvik Goswami, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/154,474

(22) Filed: Oct. 8, 2018

(51) Int. Cl.  
*G06F 11/36* (2006.01)  
*G06T 1/00* (2006.01)  
*G06F 11/26* (2006.01)  
*G06Q 30/06* (2012.01)

(52) U.S. Cl.  
CPC .......... *G06F 11/3684* (2013.01); *G06F 11/26* (2013.01); *G06F 11/368* (2013.01); *G06F 11/3692* (2013.01); *G06Q 30/0603* (2013.01); *G06T 1/0007* (2013.01)

(58) Field of Classification Search  
None  
See application file for complete search history.

(56) References Cited

U.S. PATENT DOCUMENTS

| | | | | |
|---|---|---|---|---|
| 8,856,748 B1* | 10/2014 | Larsen | ............... | G06F 11/3668 717/125 |
| 2006/0253588 A1* | 11/2006 | Gao | ................... | G06F 11/3688 709/226 |
| 2007/0113201 A1* | 5/2007 | Bales | ....................... | G06F 8/38 715/810 |
| 2008/0163015 A1* | 7/2008 | Kagan | ................. | G06F 11/2294 714/724 |
| 2009/0164848 A1* | 6/2009 | Heidasch | ............ | G06F 11/3636 714/38.14 |
| 2010/0180260 A1* | 7/2010 | Chikkadevaiah | ... | G06F 11/3664 717/125 |
| 2012/0243745 A1* | 9/2012 | Amintafreshi | ...... | G06F 11/3688 382/103 |
| 2015/0339213 A1* | 11/2015 | Lee | ..................... | G06F 11/3664 717/125 |
| 2015/0347284 A1* | 12/2015 | Hey | .................... | G06F 11/3692 717/125 |
| 2016/0085662 A1* | 3/2016 | Huang | ................ | G06F 11/3668 717/124 |
| 2016/0092180 A1* | 3/2016 | Straub | .................... | G06T 11/60 715/762 |
| 2019/0266076 A1* | 8/2019 | Maliani | .............. | G06F 11/3684 |

* cited by examiner

*Primary Examiner* — Philip Wang  
(74) *Attorney, Agent, or Firm* — Fletcher Yoder PC

(57) ABSTRACT

Techniques for designing tests of a service catalog without having to write and/or edit the underlying scripts are disclosed. A library of tests step templates is populated and provided to a user. The tests step templates in the library may be selected by the user and edited to fill in specific parameters that specify the actions to be taken during execution of the test step. The test step may then be combined with other test steps to form a test. In some embodiments, the library may include test templates made up of frequently used sequences of individual test steps. Once a test has been designed, the test may be run, either manually triggered by a user or according to a schedule. The system may then run through the steps of the test, as specified by the user, by running the underlying scripts. As the test is run, results are generated.

20 Claims, 22 Drawing Sheets

FIG. 18

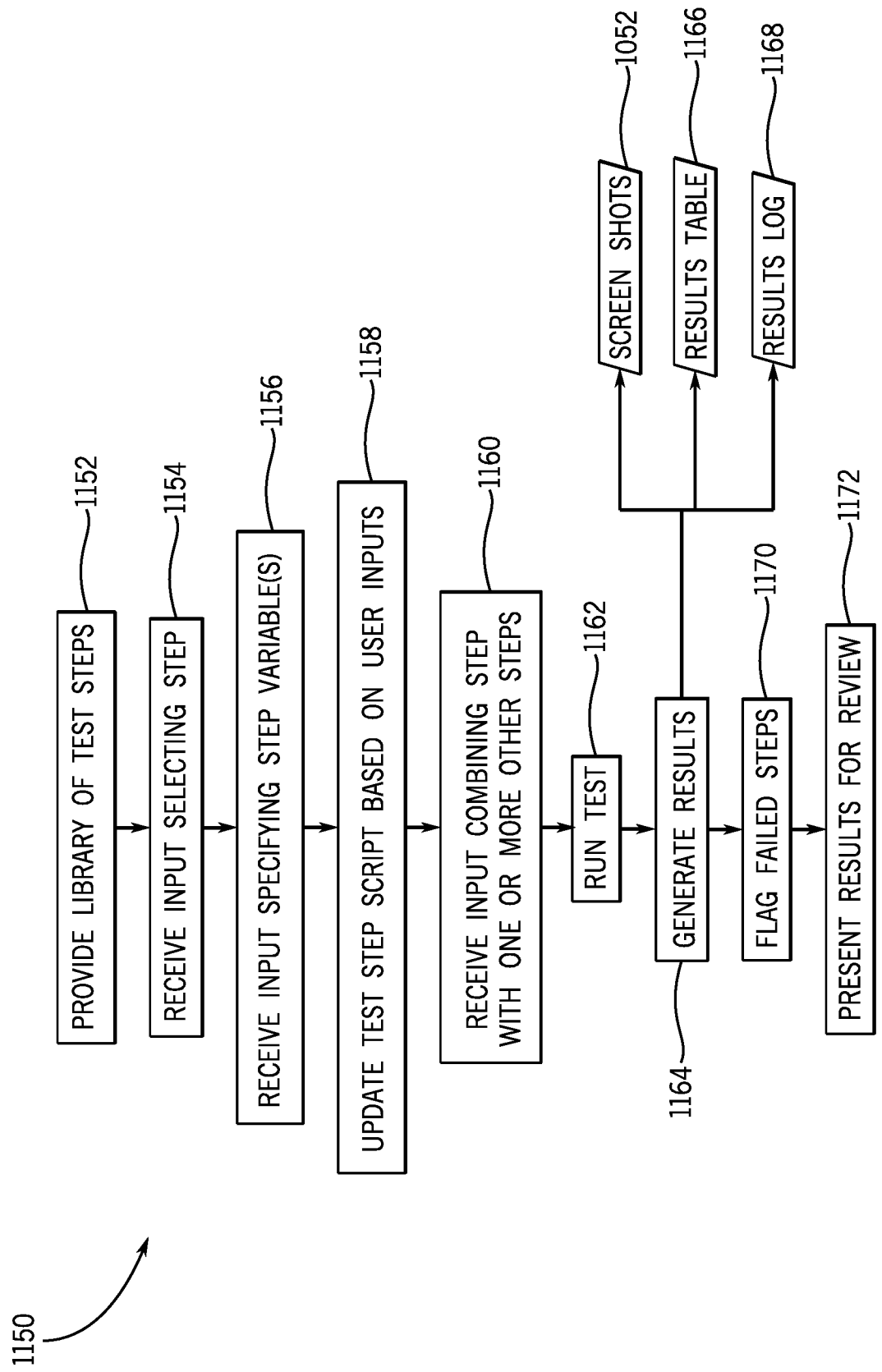

SYSTEMS AND METHOD FOR AUTOMATED TESTING FRAMEWORK FOR SERVICE PORTAL CATALOG

BACKGROUND

The present disclosure relates generally to service catalogs, and more specifically to an automated testing framework for service catalogs accessible via a service portal.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

In implementing a network, an enterprise may lease resources from a service provider. Larger enterprises may operate a service catalog by which employees may request hardware, software, services, etc. (e.g., a computer, a smart phone, a tablet, a particular software package, help setting up email, help setting up virtual private network ("VPN") access, etc.). The service catalog may be provided to the enterprise and at least partially operated by the service provider. The enterprise may then modify the service catalog as it wishes to customize service catalog to its particular implementation of the service catalog. Accordingly, changes to the service catalog made by either the enterprise or the service provider may conflict with previous changes made by either party, resulting in disruptions to the service catalog.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques allow a user to design tests for a service catalog before customizations or updates are implemented without having to write and/or edit the underlying scripts run to execute the tests. Specifically, a library of tests step templates is populated and provided to the user. The test steps may cover frequently used steps performed when testing a service catalog, such as locating an item within the service catalog, validating available parameters for the item, setting parameters for the item, validating price for the item, submitting an order, etc. The test step templates in the library may be selected by the user and edited to fill in specific parameters that specify the actions to be taken during execution of the test step. The test step may then be combined with other test steps to form a test. In some embodiments, the library may include test templates made up of frequently used sequences of individual test steps. Once a test has been designed, the test may be run, either manually triggered by a user, or according to a schedule. The system may then run through the steps of the test, as specified by the user, by running the underlying scripts. As the test is run, results may be generated. The results may include, for example, screenshots of the service catalog user interface as the various steps are being performed, a table of results for each step, which may include a status and a summary, and/or a test log. In some embodiments, failed test steps may be flagged so as to call the user's attention to these steps for remedial action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 18 is a screenshot of the GUI displaying a run test pop up window that opens within the GUI when the test is running, in accordance with aspects of the present disclosure;

FIG. 22 is a flow chart of a process for testing elements of the service catalog, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Figure 1:
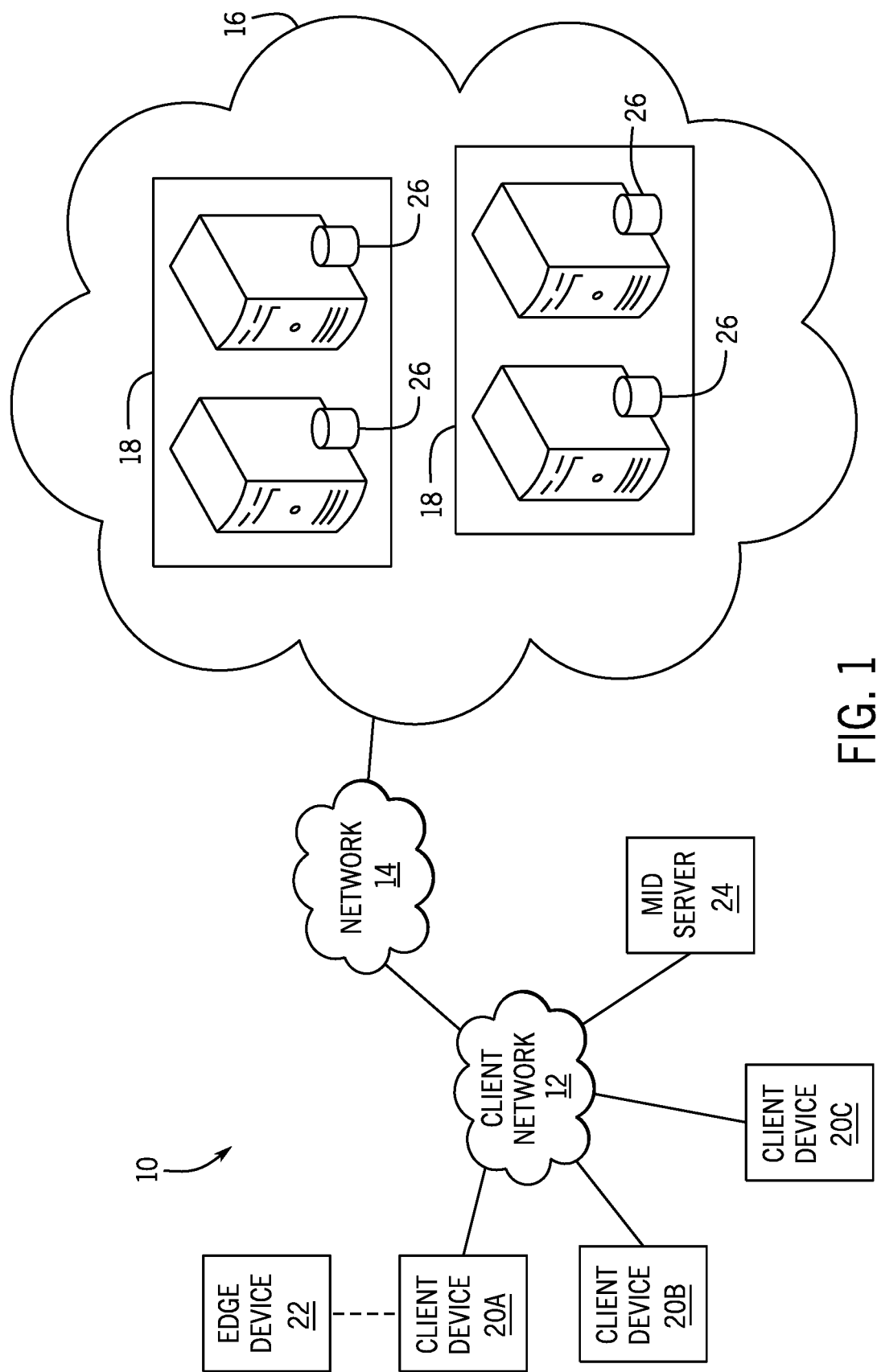
FIG. 1 is a block diagram of an embodiment of a cloud architecture in which embodiments of the present disclosure may operate.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
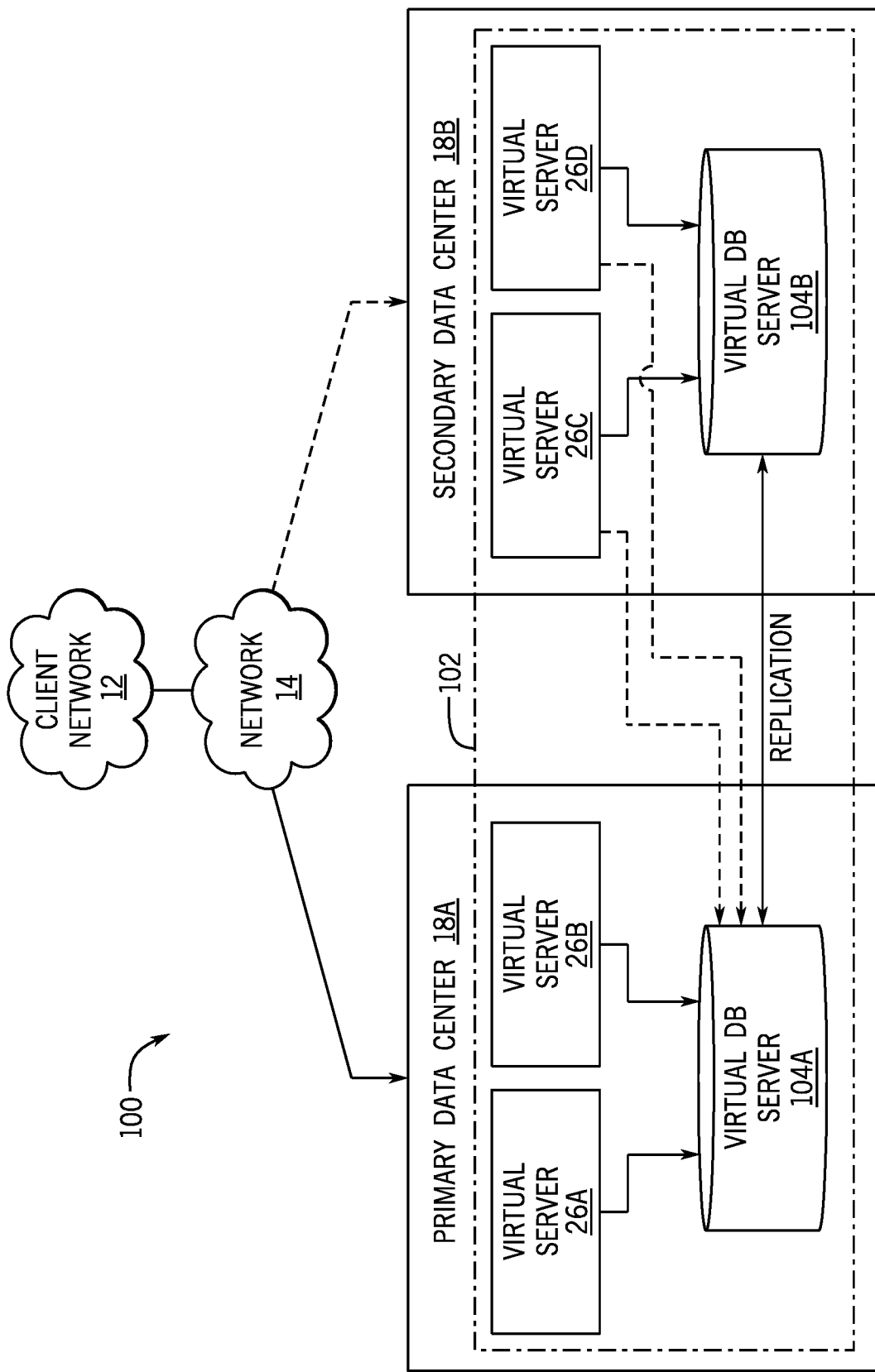
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B (e.g., via the network 14).

As shown in FIG. 2, the primary virtual database server 104A may backup data to the secondary virtual database server 104B using a database replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
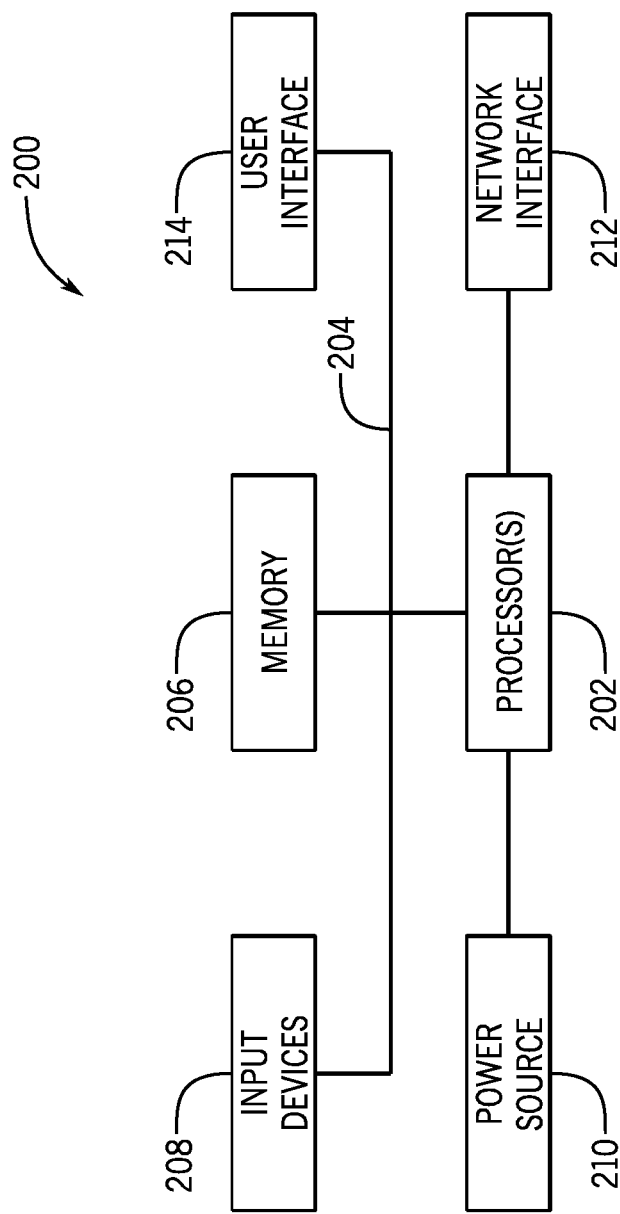
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
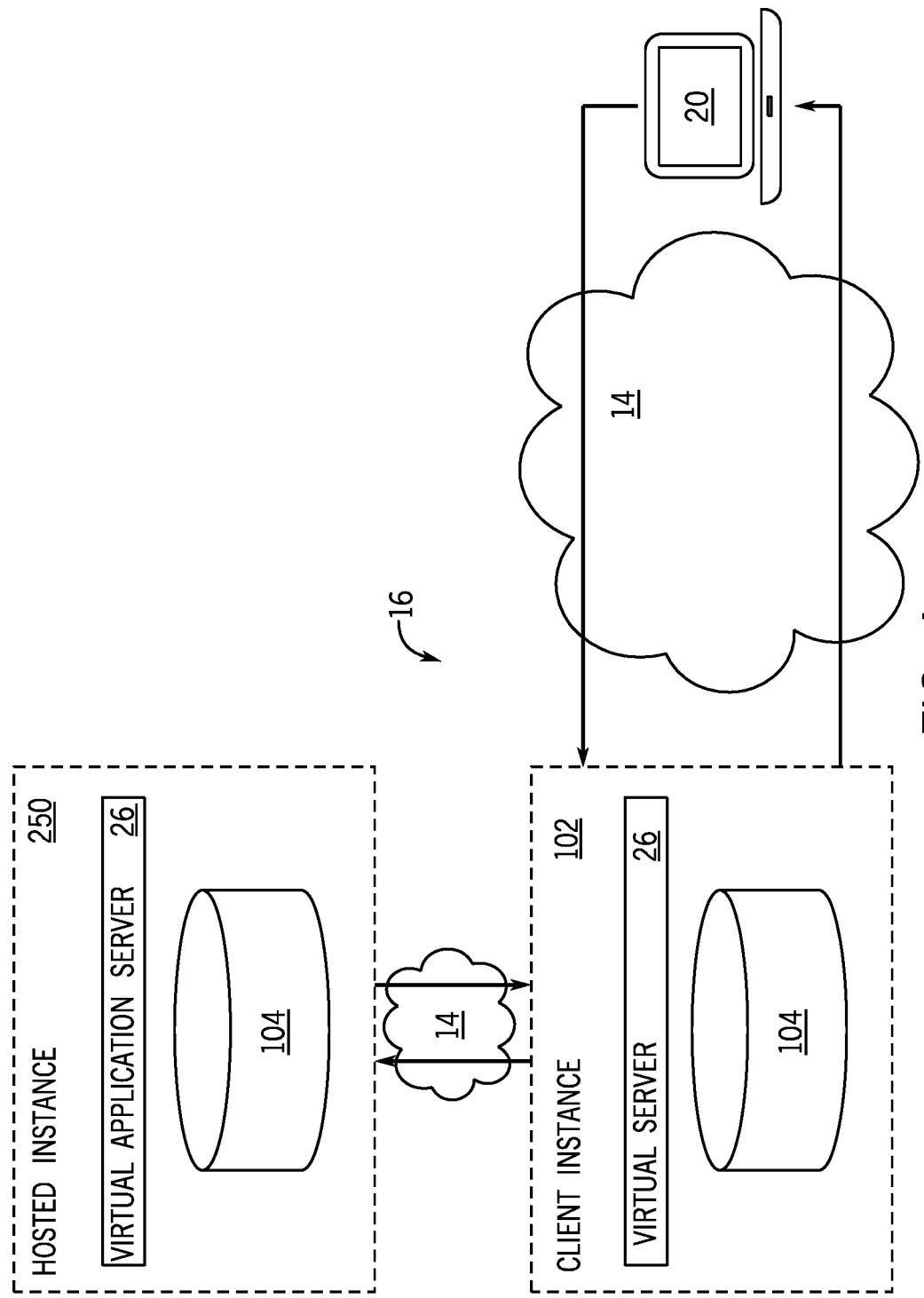
FIG. 4 is a block diagram illustrating an embodiment in which a virtual server supports and enables a client instance, in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. The client instance 102 may also be configured to communicate with other instances, such as the hosted instance 250 shown in FIG. 4, which may also include a virtual application server 26 and a virtual database server 104.

An enterprise may implement the cloud-based platform 16 to more efficiently run its operations. For example, each employee and/or contractor may be assigned one or more client devices 20, which may be connected to the network 14, from which they may perform their assigned tasks and duties. For larger networks 14 (e.g., implemented by enterprises with a large number of employees), the enterprise may operate a service catalog by which employees may request hardware, software, services, etc. (e.g., a computer, a smart phone, a tablet, a particular software package, help setting up email, help setting up virtual private network ("VPN") access, etc.). The service catalog may be accessible by a web browser or an application running on client instance 102 and/or the client device 20 via the network 14. The service catalog may list hardware, software, services, and various other things as items within the service catalog. The service catalog may be configured by the enterprise to recommend products to a user based on what is known about the user and the position they hold. For example, based on the position held by the user (e.g., developer, graphic designer, project manager, data analyst, etc.), the enterprise may know how the piece of equipment is likely to be used (e.g., whether the user is likely to utilize a computer capable of performing more processing intensive tasks, or whether the user travels frequently and is more likely to prefer a smaller computer). Further, the enterprise may configure the service catalog to emphasize certain preferred products or services (e.g., products and/or services that are highly reviewed, products and/or services for which the enterprise receives a discount, etc.). The enterprise may further set up workflows underlying the service catalog to streamline fulfillment, procurement, delivery, installation, etc. Within the service catalog, a user may select an item to view the item's page within the service catalog. The item's page may include one or more variables, which the user may set (e.g., via drop-down menu, entering alphanumeric characters, etc.) to configure the item. The user may then order the item.

The service catalog may be provided to the enterprise and at least partially operated by a service provider. The enterprise may then modify the service catalog as it wishes to customize the service catalog to its particular implementation of the service catalog. Accordingly, the given service provider may provide service catalogs to a plurality of enterprises. The service provider may provide updates to the service catalog according to a release schedule. Some of the enterprises may update their own service catalogs according to a different release schedule. Accordingly, before implementing an update or a new release of the service catalog, it may be helpful to run a testing protocol on the service catalog to determine where changes made by the update or the new release may conflict with previously implemented customizations or changes made by an enterprise to cause disruptions within the service catalog. Once these possible conflicts are known, changes can be made to resolve the conflicts so implementation of the update or the new release goes smoothly.

For example, a test may include running scripts that simulate selecting an item in the service catalog, setting one or more variables (size, color, specifications, etc.), selecting a quantity, submitting the order, and in some cases, even some or all of the procurement of that order. The test may verify variable options, the available quantity, the price, who can view what items, who has permission to order what, etc. The test may be divided up into a number of steps, each step having an associated script that is executed. However, because most users are uncomfortable writing and/or editing scripts, a library of test step templates may be provided to the user by the service provider, the enterprise, or both. As is described in more detail below, the user may edit the steps via a GUI and then build up a test by combining multiple steps from the library. The library and the underlying scripts may be stored, for example, in on-premises servers, cloud servers, within a virtual database server, or on the memory of a hardware device connected to the network. For each step, a user may provide inputs specifying how the step is to be performed. These inputs may then be used to update the script associated with the test step. When the test is then initiated by the user, the respective scripts run, thus performing the test. As the test runs, screenshots may be captured that show what a user sees when placing an order through the service catalog. In some embodiments, a test log and/or results table may be populated as the test runs or following completion of the test. Upon completion of the test, a user may review the results to determine where there are conflicts to be resolved.

Figure 5:
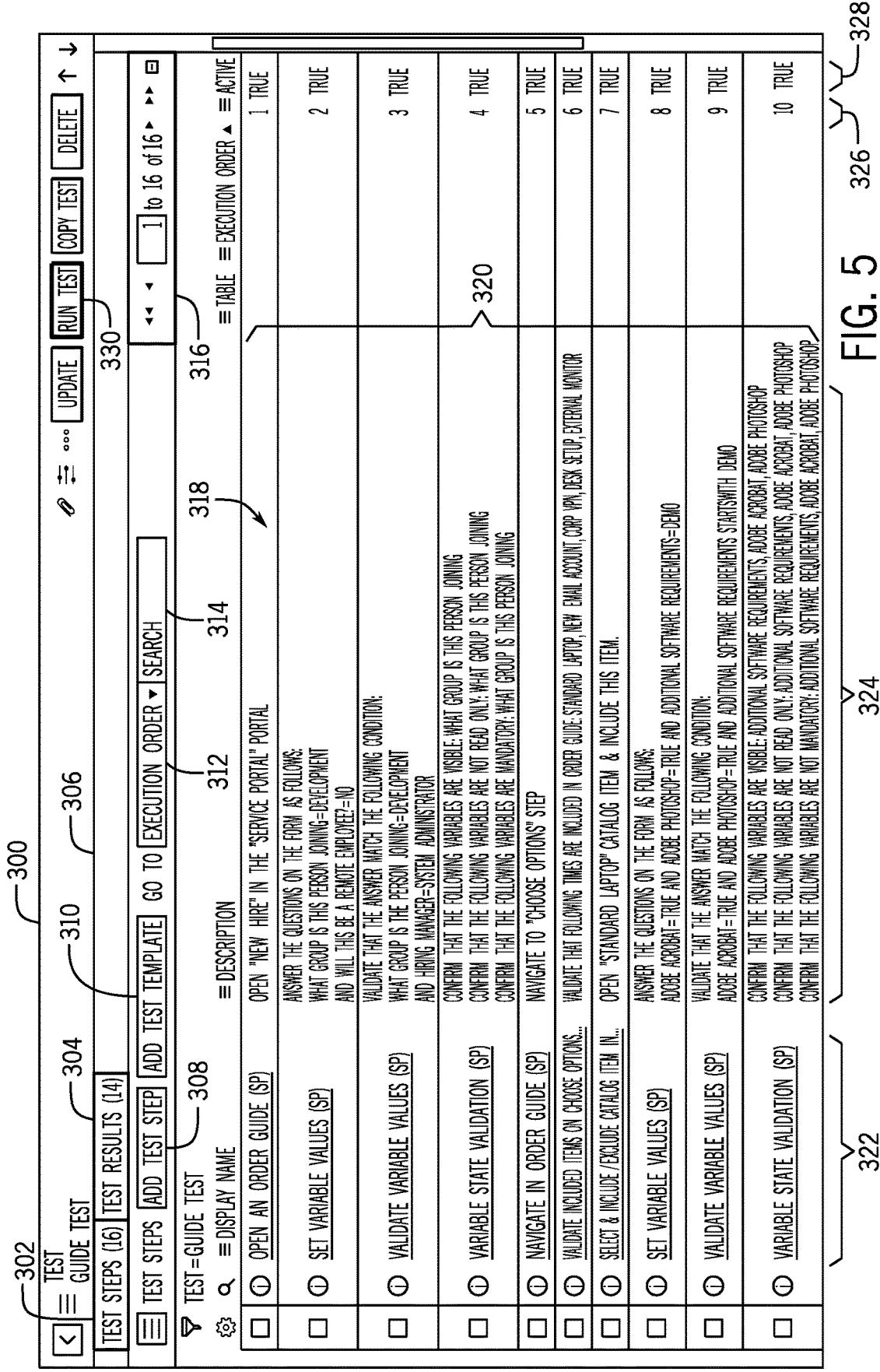
FIG. 5 is a screenshot of a graphical user interface (GUI) displaying steps for a test called "Guide Test", in accordance with aspects of the present disclosure.

With the preceding in mind, FIG. 5 is a screenshot of a graphical user interface (GUI) 300 displaying some of the steps for a test called "Guide Test". This GUI 300 may be accessible via a service portal. The service portal may be a home page through which users may access various features of the service provider cloud infrastructure. As shown, the GUI 300 includes a "Test Steps" tab 302 and a "Test Results" tab 304. When the test steps tab 302 is selected, the GUI 300 displays the various steps of the selected test. When the test results tab 304 is selected, the GUI 300 displays the results of the test. Review of test results is shown and described in more detail below with regard to FIGS. 19-21.

When the test steps 302 tab is selected, a toolbar 306 is displayed. The toolbar includes an "Add Test Step" button 308, an "Add Test Template" button 310, a "sort by" field 312, a search field 314, and a navigation area 316. The add test step button 308, when selected, allows the user to add a step to an existing test by selecting a step template from the library and then specify one or more variables of the test step. This is shown and described in more detail with regard to FIG. 17. The add test template button 310 allows a user to select a test template from a test template library to create a new test. The test template may include, for example, several frequently combined steps to customize a frequently run test (e.g., a purchase item test). The sort by field 312 allows a user to specify an order in which the test steps are displayed. In the instant embodiment, the test steps are listed in the order in which they occur. However, the test steps may be listed according to some other order, such as order of creation, order of last modification, alphabetical order, % customized from stock step, likelihood of success/failure, etc. The search field 314 allows a user to enter text to search the listed test steps. The navigation area 316 allows the user to navigate the listed steps. In the instant embodiment, the test includes 16 steps, which all fit on a single page, so the navigation area 316 may not be utilized. However, for tests having more steps than fit on a single page, the navigation area 316 may be helpful in navigating the listed steps.

As illustrated, when the test steps 302 tab is selected, a test steps window 318 is displayed below the toolbar 306 and lists the various steps 320 of the selected test in the order specified in the sort by field 312. As shown, each test step listing 320 includes a display name 322, a description 324, an execution order 326, and an active status 328. The display name 322 is a short character string that represents the name given to the test step 320. The description 324 is a longer text field that describes what the test step does. As shown, in some embodiments, the description 324 may list how variables are to be set in the test step 320 and/or which inputs are provided. The execution order 326 for each test step 320 is indicative of the test step's order within the sequence of test steps 320 for the test. The active status 328 indicates whether the test step 320 is turned on or turned off. A value of "true" indicates that the test step 320 is turned on. A value of "false" indicates that the test step 320 is turned off. To run the test, the user may select the run test button 330. When one of the test steps 320 is selected (e.g., a user clicks on the display name 322 of a test step 320), the GUI 300 is updated to display a test step details window.

Figure 6:
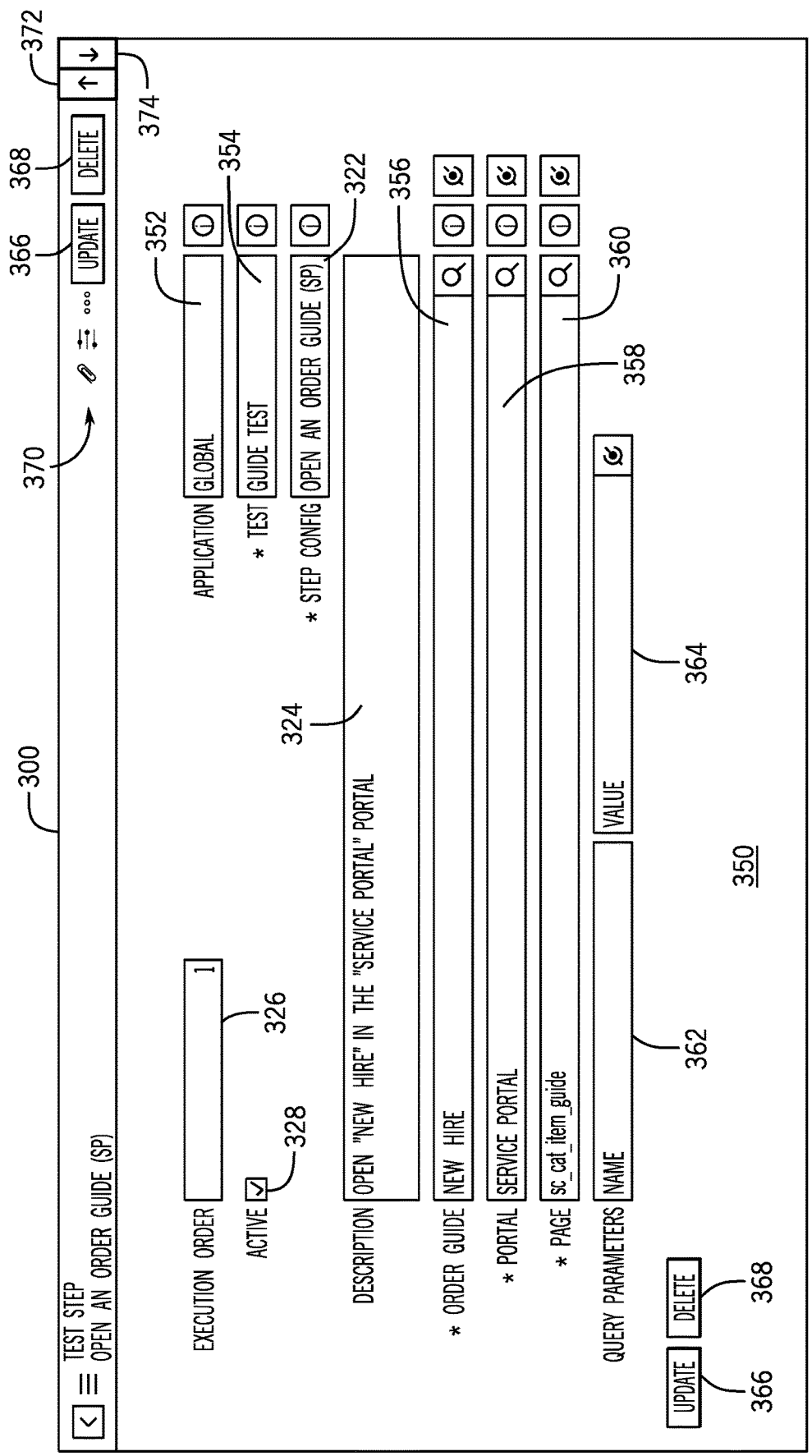
FIG. 6 is a screenshot of the GUI displaying a test step details window for an "Open an Order Guide" step of the test, in accordance with aspects of the present disclosure.

FIG. 6 is a screenshot of the graphical user interface (GUI) 300 displaying a test step details window 350 for the "Open an Order Guide" step 320 shown in FIG. 5. The test step details window 350 includes a few standard fields for each test step. For example, the test step details window 350 shown in FIG. 6 includes an application type field 352, a test name field 354, a test step display name field 322, an execution order field 326, an active status field 328, and a description field 324. The application type field 352 indicates whether the corresponding application (in this case, the service catalog) is global or scoped (e.g., configured based on instance or client specific parameters). If the application is scoped, the application type field 352 may merely indicate that the application is scoped, or may indicate a specific scope of the application. The test field 354 indicates the name of the test of which the test step is a part. The display name field 322 shows the name given to the test step. The execution order field 326 indicates the order of the test step relative to the other test steps. The active status field 328 indicates (such as by a check box) whether or not the test step is active. If the test step is active, the test step is performed when the test is run. If the test step is not active, the test step is skipped when the test is run. The test step description field 324 provides a description of what occurs during the test step when the test is run. In some embodiments, the description field 324 may include how specific variables are set, what actions are taken, etc.

As shown, the test step details window 350 may include a number of other fields that are specific to the given test step. For example, in the test step window 350 of FIG. 6, which corresponds to an "Open Order Guide" test step, additional fields include an order guide field 356, a portal field 358, a page field 360, a query parameters name field 362, and a query parameters value field 364. The order guide field 356 specifies the type or order guide to the opened. In this case, the order guide to be opened is a new hire order guide. The portal field 358 indicates the portal associated with the order guide, in this case the Service Portal. The page field 360 displays the page associated with the order guide. In this case, the associated page is called "sc_cat_item_guide". The query parameters name field 362 indicates a name of a parameter to be queried during the test step and the query parameters value field 364 indicates a value associated with the corresponding name. Though a single set of query parameter name and value are shown in FIG. 6, it should be understood that once a query parameter name and value pair are entered, new fields may be added to accommodate a new query parameter name and value pair.

Once the test step has been selected, the test step details window opened, and the various fields filled in, modified, reviewed, etc., a user may select the update button 366 to update the test step to reflect the newly entered data. Alternatively, the user may select the delete button 368 to delete the test step. As shown in FIG. 6, the test step details window may also include a navigation toolbar 370, which may include an additional set of update and delete buttons 366, 368, as well as up and down arrows 372, 374, for navigating to the previous step and next step, respectively. Accordingly, the user may navigate from the test step details window from one step directly to the test step details window of the previous or subsequent step without navigating back to the test steps window and selecting the previous or subsequent step. As shown in FIG. 6, the up arrow 372 is greyed out, indicating that this is the first step in the test.

Figure 7:
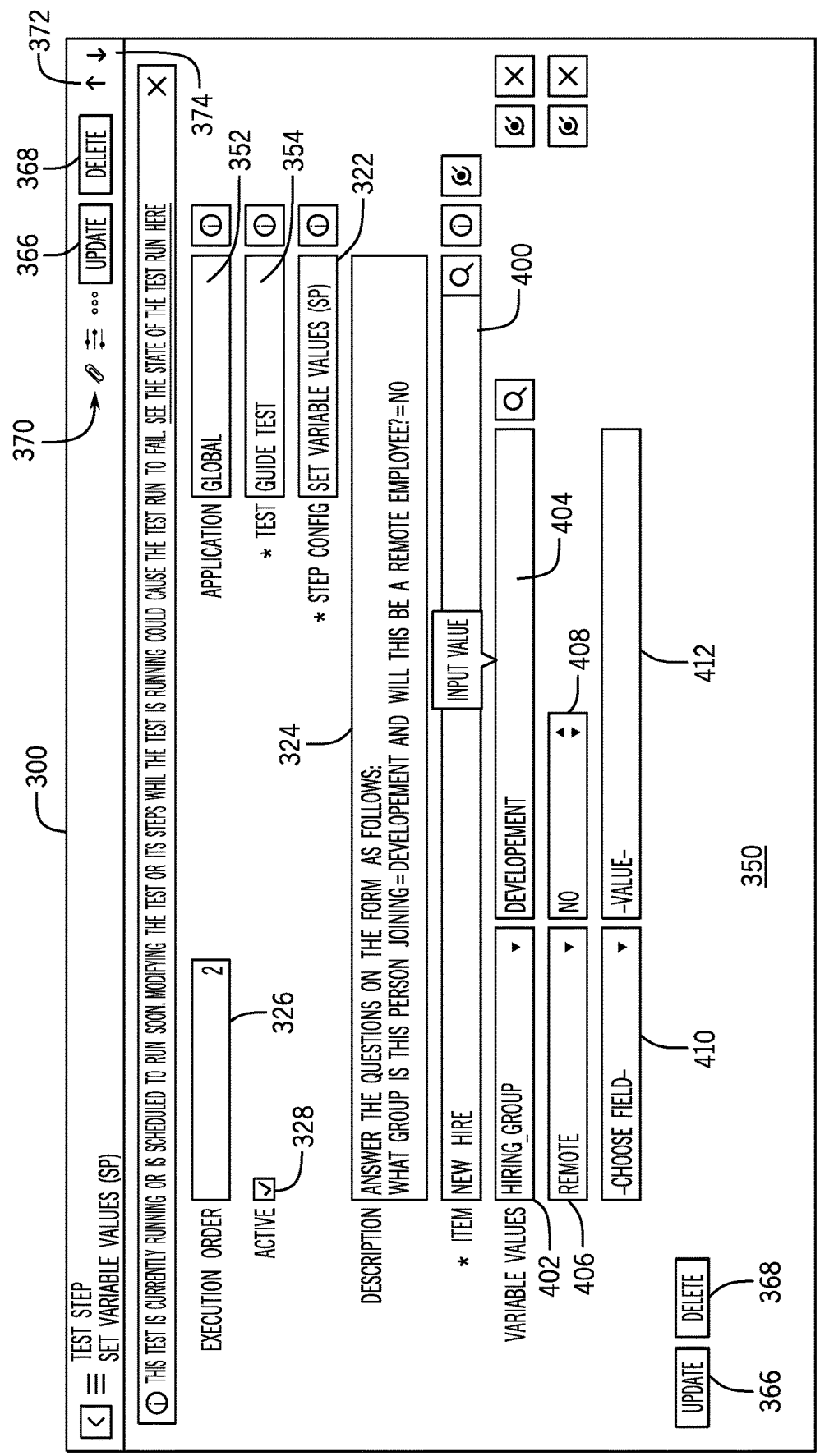
FIG. 7 is a screenshot of the GUI displaying the test step details window for a "Set Variable Values" step of the test, in accordance with aspects of the present disclosure.

When the down arrow 374 is selected, the test step details window 350 is updated to include information about the subsequent test step, called "Set Variable Values", as shown in FIG. 7. As explained by the text in the description field 324, during this step, the test fills out a form that is presented to a user with specific answers. An item field 400 indicates the associated item in the service catalog is "New hire". That is, the item in the in the service catalog may include information technology (IT) set up for a new employee. The test step details window 350 includes several fields underneath the title "Variable Values" which may correspond to how to fill out the provided form. For example, in a first variable field 402, a hiring group variable has been selected, in the hiring group field 404 "development" has been specified, indicating that the new employee has been hired by the development group. In the second variable field 406, remote status has been selected, and in the remote status field "no" has been selected, indicating that the new employee will not be a remote employee. The third variable field 410 has not yet been selected. A user may select the third variable field 410 to see a list of options (e.g., via a drop-down menu). Once a variable has been selected, the blank field 412 may be populated with options. The user may then select the blank field 412 to see the various options for the third variables (e.g., via a drop-down menu). As the third variable field 410 is filled in, a fourth variable field may appear, and so forth. Once the variables of the form have been provided, the user may select the update button 366.

Figure 8:
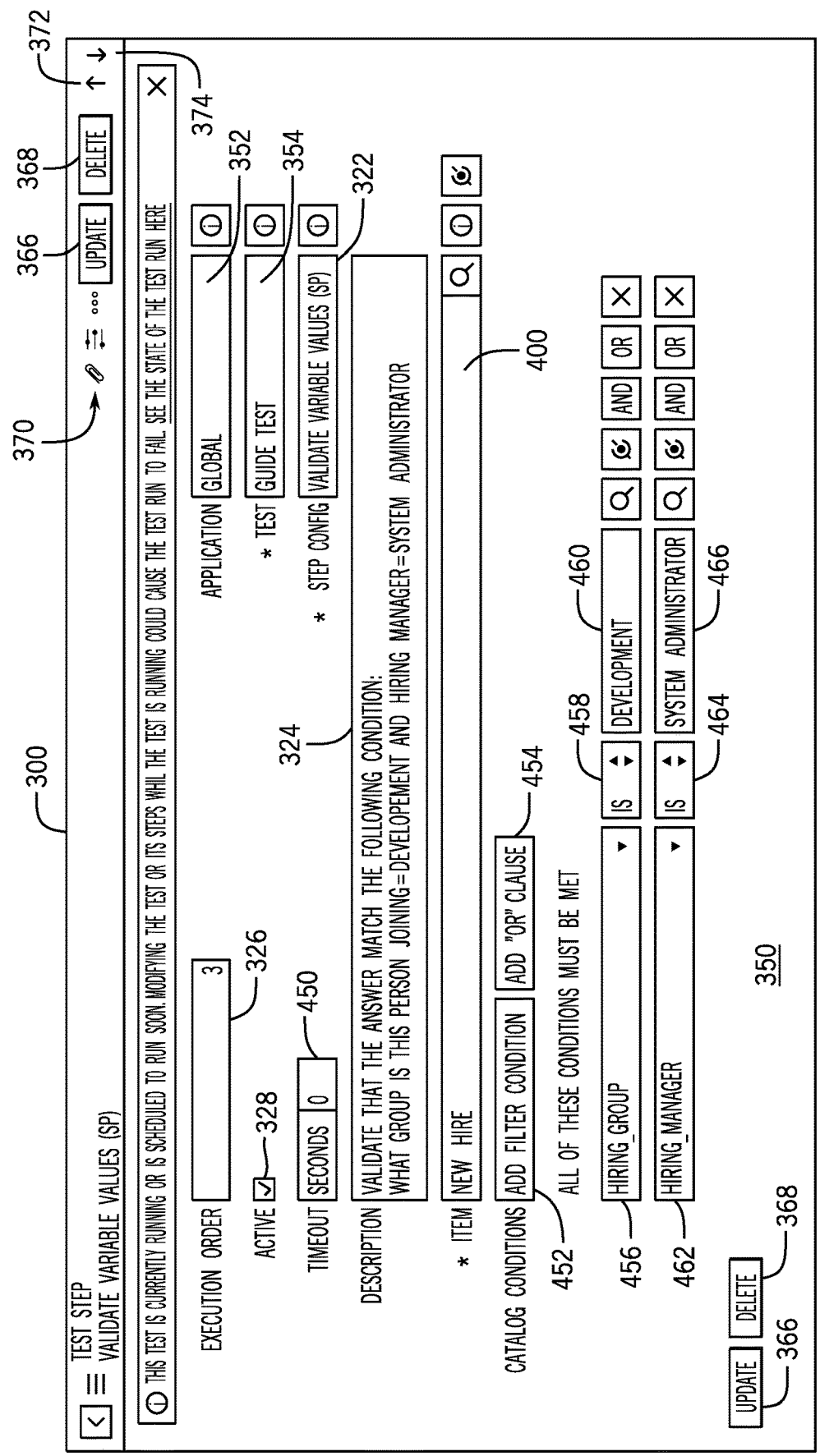
FIG. 8 is a screenshot of the GUI displaying the test step details window for a "Validate Variable Values" step of the test, in accordance with aspects of the present disclosure.

When the down arrow 374 is selected, the test step details window 350 is updated to include information about the third test step, called "Validate Variable Values", as shown in FIG. 8. As explained by the text in the description field 324, during this step, the variables are validated to make sure the specified condition is met. The test step details window 350 includes a timeout field 450. If a non-zero time is entered, the test may let the set time period elapse. If the step has not been completed by the expiration of the time period, a timeout may be registered. The fields toward the lower portion of the test step details window 350 represent the conditions that must be met for the test step to be completed successfully. A user may add a filter condition by selecting the "Add Filter Condition" button 452. A user may add an "or" condition by selecting the "Add 'OR' Clause" button 454. If an "or" condition is not in place, all of the conditions must be met for the test step to be successful. If an "or" condition is entered, then one condition or set of conditions or the other must be met for the test step to be successful. In the instant case, the first condition is that the hiring group must be the development group. This is represented by the first variable field 456 being set to hiring group, the first is/is not field 458 being set to "is", and the hiring group field 460 being set to "development". The second condition is that the hiring manager must be the system administrator. This is represented by the second variable field 462 being set to hiring manager, the second is/is not field 464 being set to "is", and the hiring manager field 466 being set to "system administrator". Once the fields have been provided, the user may select the update button 366.

Figure 9:
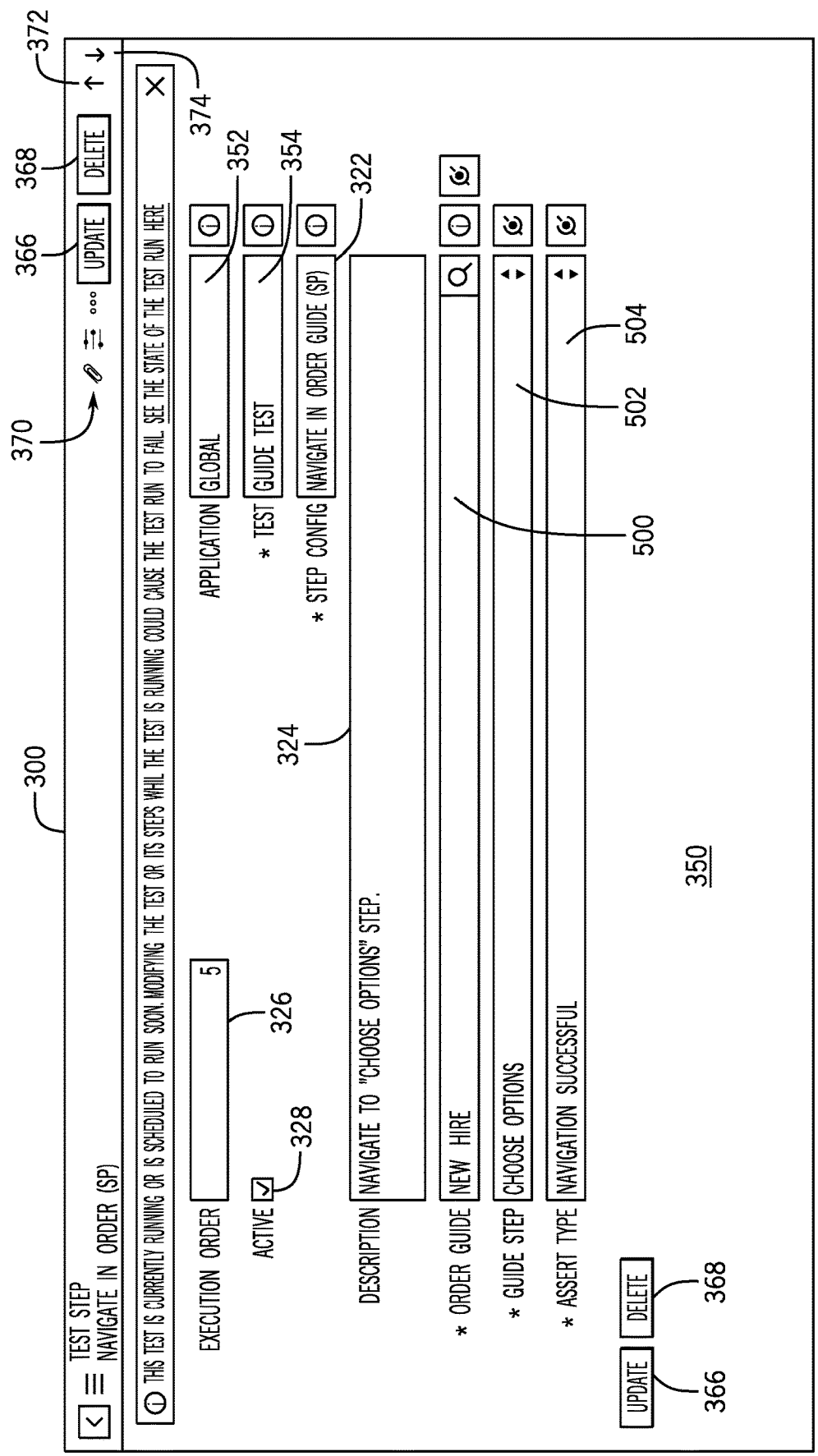
FIG. 9 is a screenshot of the GUI displaying the test step details window for a "Navigate in order Guide" step of the test, in accordance with aspects of the present disclosure.

When the down arrow 374 is selected, the test step details window 350 is updated to include information about the fifth test step, called "Navigate in order Guide", as shown in FIG. 9. As explained by the text in the description field 324, during this step, the test navigates to the "choose options" step. The order guide field 500 indicates "new hire", so the new hire item from the order guide has been selected. The guide step 502 indicates the action to be performed during this step of the test. In this particular step, the action selecting "choose options" to navigate to the choose options step. The assert type field 504 indicates that if the navigation is successful, the test moves on the next step.

Figure 10:
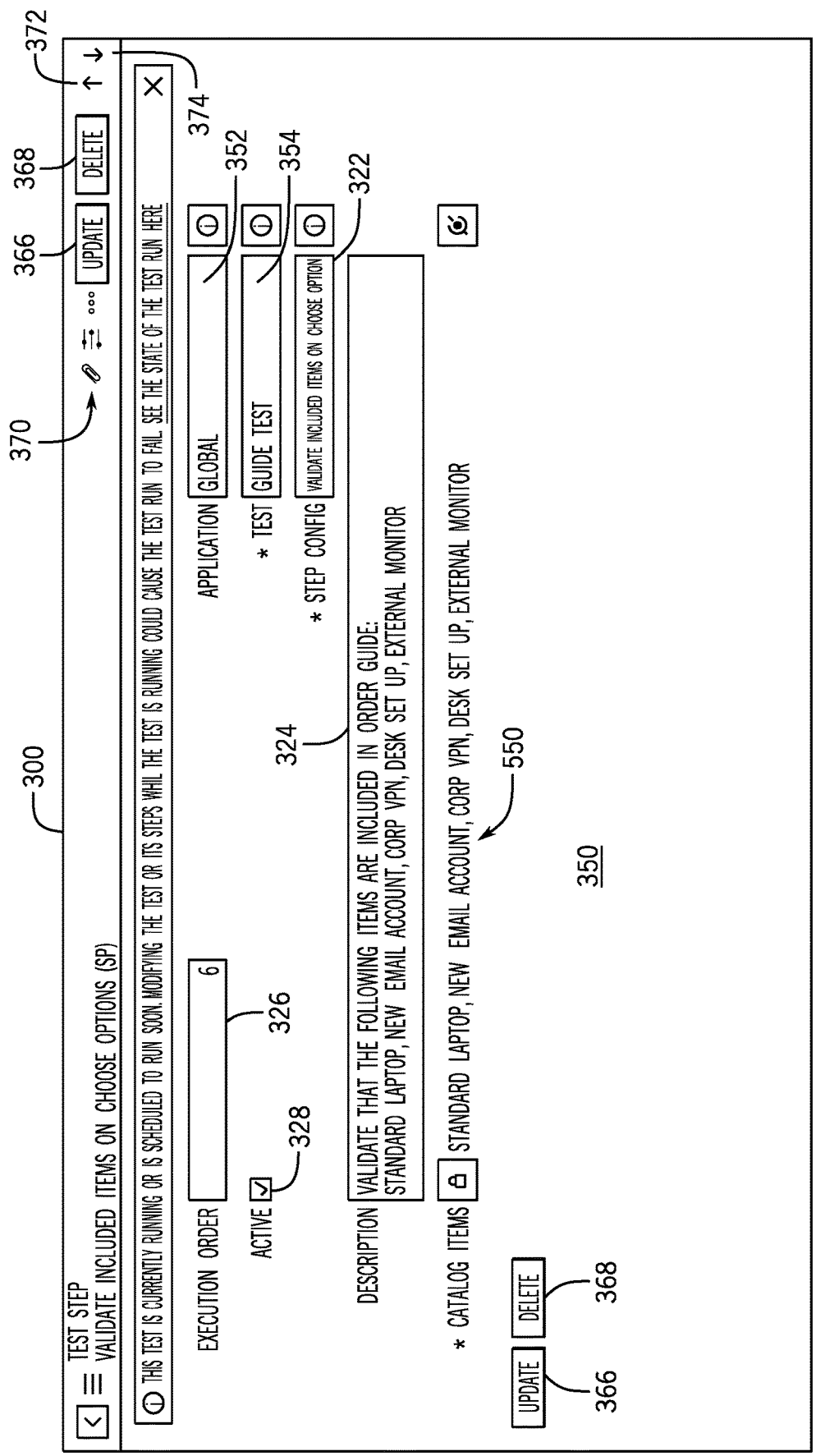
FIG. 10 is a screenshot of the GUI displaying the test step details window for a "Validate Included Items on Choose Options" step of the test, in accordance with aspects of the present disclosure.

When the down arrow 374 is selected, the test step details window 350 is updated to include information about the sixth test step, called "Validate Included Items on Choose Options", as shown in FIG. 10. As explained by the text in the description field 324, during this step, the test confirms that certain listed specific items are included in the order guide. A catalog items field 550 lists the items to be included in the order guide. If the listed items are all included in the order guide, the test step is successful. If the listed items are not all included in the order guide, the test step is failed.

Figure 11:
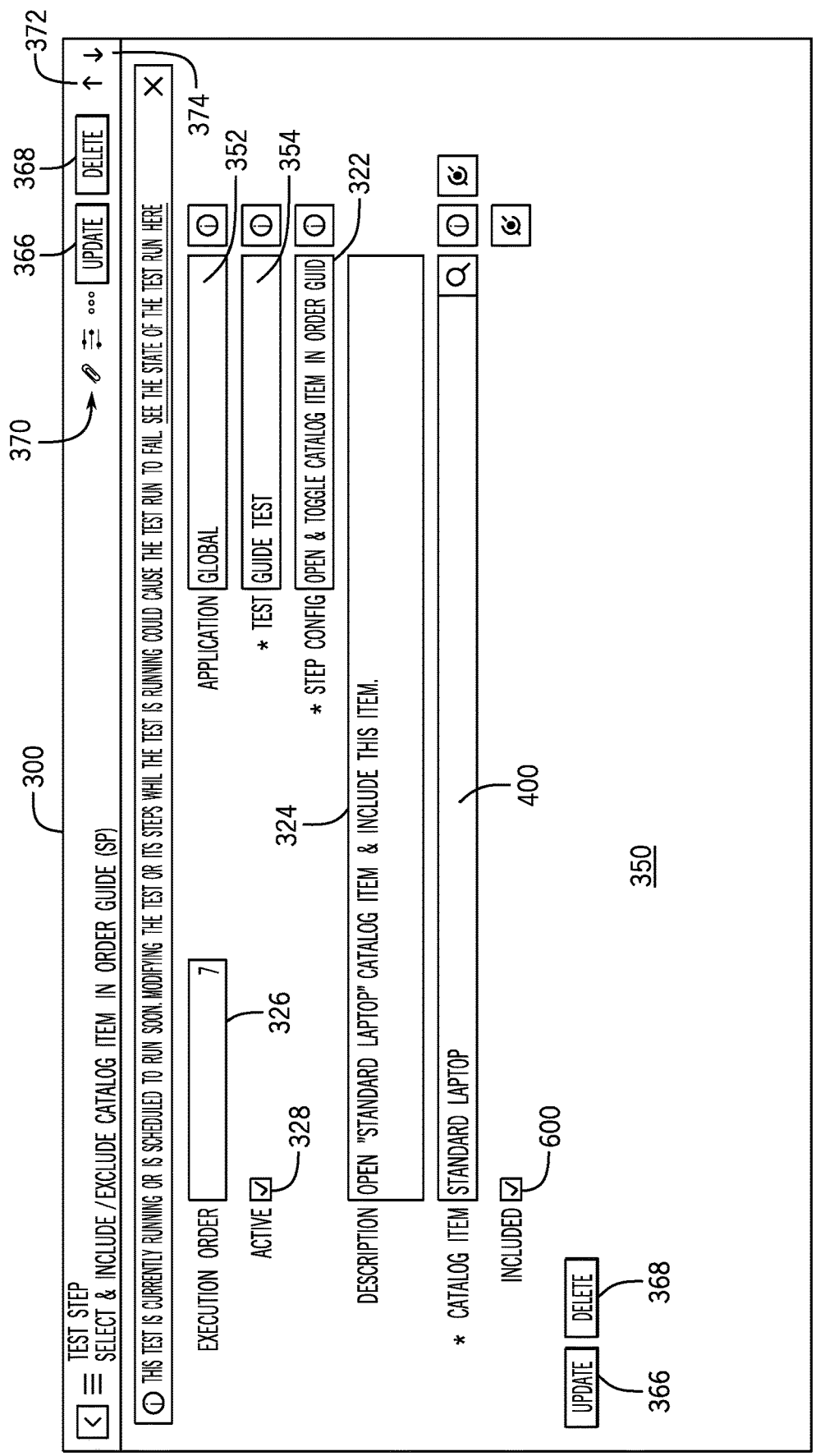
FIG. 11 is a screenshot of the GUI displaying the test step details window for a "Select & Include/Exclude Catalog Item on Order Guide" step of the test, in accordance with aspects of the present disclosure.

When the down arrow 374 is selected, the test step details window 350 is updated to include information about the seventh test step, called "Select & Include/Exclude Catalog Item on Order Guide", as shown in FIG. 11. As explained by the text in the description field 324, during this step, the test opens the "standard laptop" item in the service catalog and adds the item to the cart. The catalog item field 400 lists the catalog item to be included, in this case a standard laptop. The included field 600 is check box that indicates whether or not the item is to be included.

Figure 12:
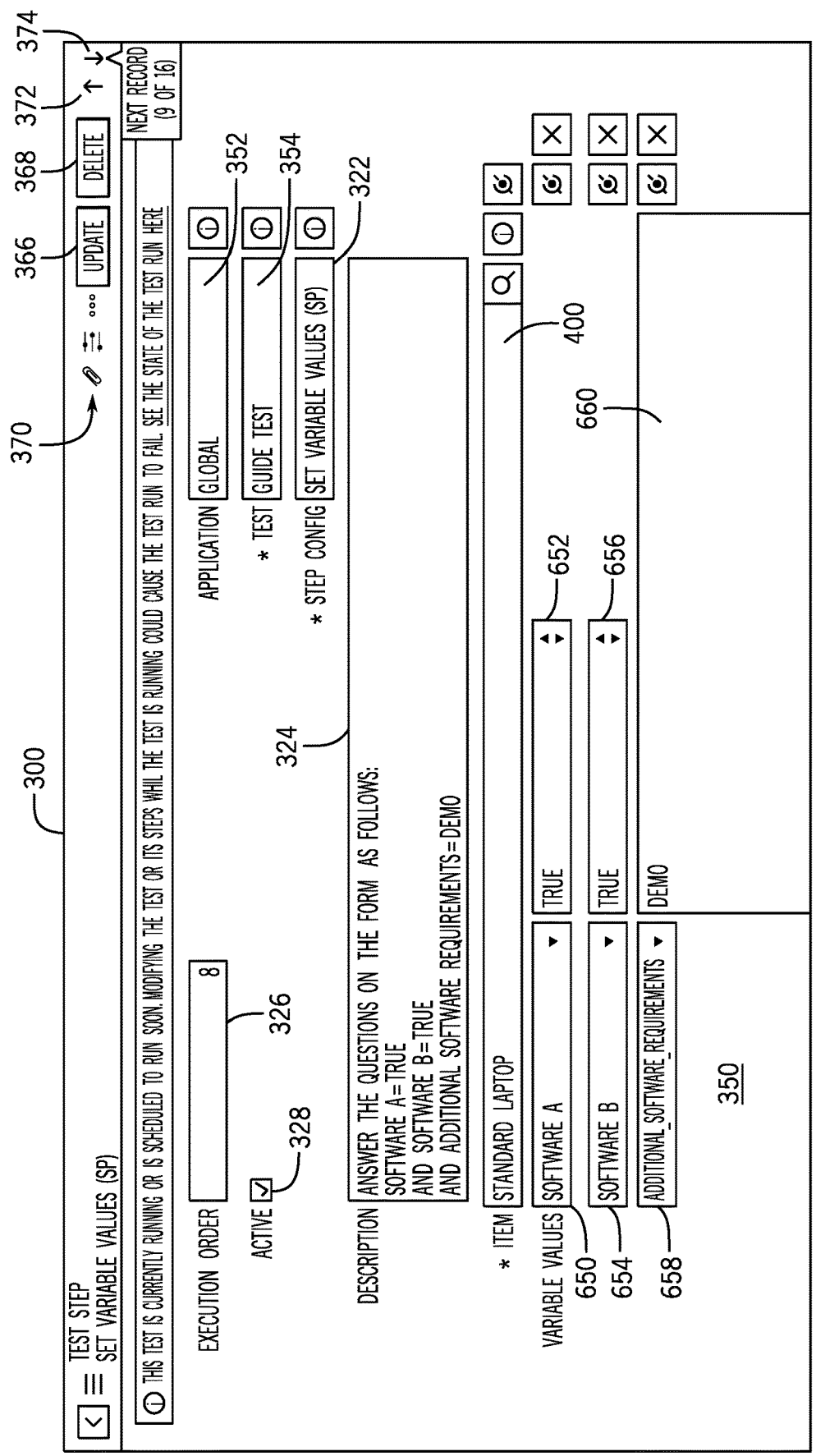
FIG. 12 is a screenshot of the GUI displaying the test step details window for a "Set Variable Values" step of the test, in accordance with aspects of the present disclosure.

When the down arrow 374 is selected, the test step details window 350 is updated to include information about the eighth test step, called "Set Variable Values", as shown in FIG. 12. As explained by the text in the description field 324, during this step, another form is filled out with specified variables having corresponding values. In this specific case, the standard laptop will be provided with software package A, software package B, and a demonstration. This is set out by the first variable field 650 being set to software A with the software A field 652 being set to true, the second variable field 654 being set to software B with the software B field 656 being set to true, the third variable field 658 being set to additional software requirements with the additional software field 660 being set to demo.

Figure 13:
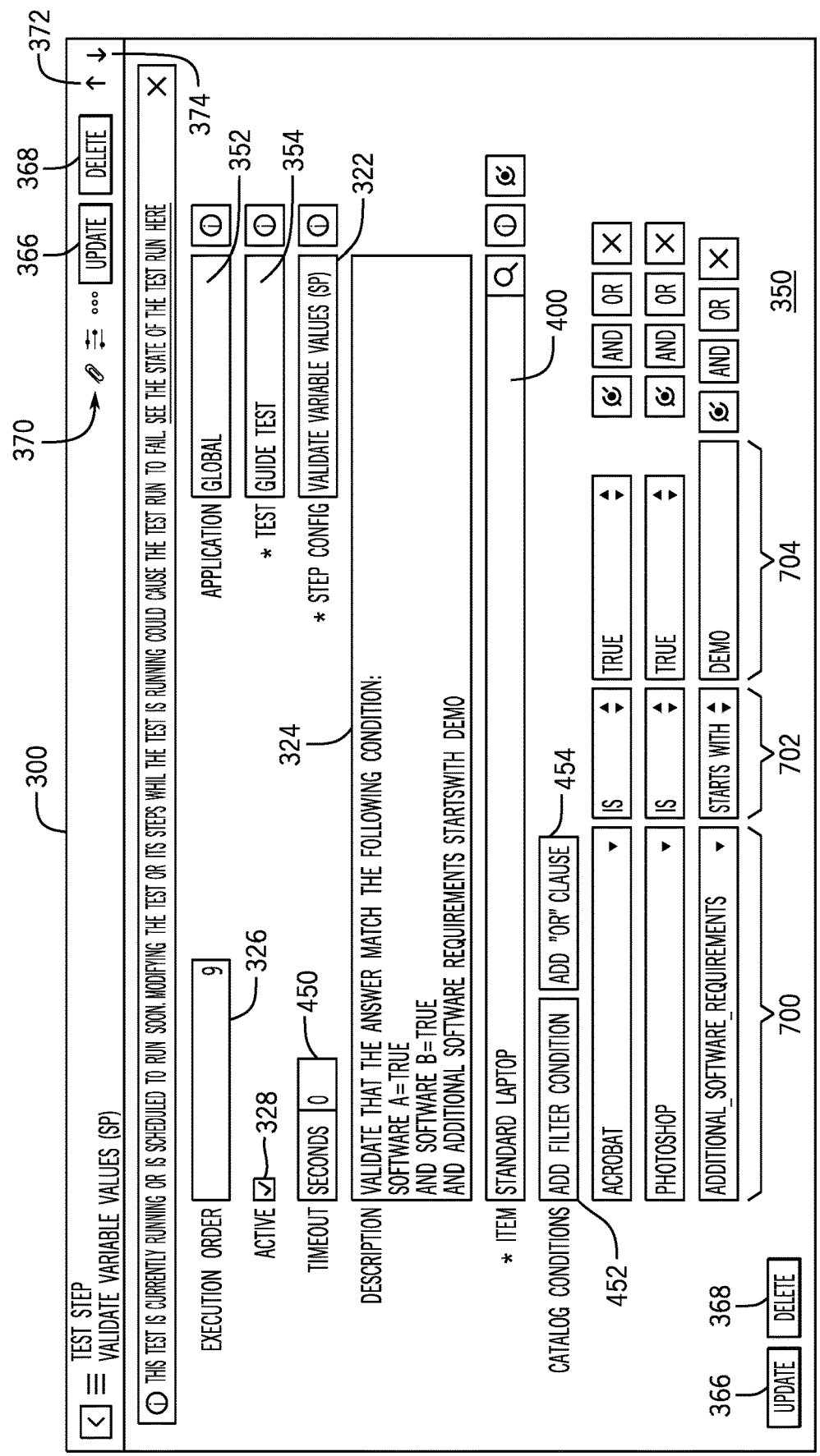
FIG. 13 is a screenshot of the GUI displaying the test step details window for a "Validate Variable Values" step of the test, in accordance with aspects of the present disclosure.

When the down arrow 374 is selected, the test step details window 350 is updated to include information about the ninth test step, called "Validate Variable Values", as shown in FIG. 13. As explained by the text in the description field 324, during this step, the test validates that the answers match the variables outline in FIG. 12. As previously described, the user may use the add filter condition button 452 and/or the add "or" clause button 454 to add additional filter conditions or "or" clauses according to certain variables. As illustrated, multiple variable conditions are listed in FIG. 13, each including a variable selection field 700, a logical operator selection field 702, and a value selection field 704. As previously described, if there is no "or" clause, all of the conditions must be met for the step to be successful. If there is an "or" clause, all of the conditions on one side of the "or" clause must be met for the step to be successful. Otherwise, the test step fails.

Figure 14:
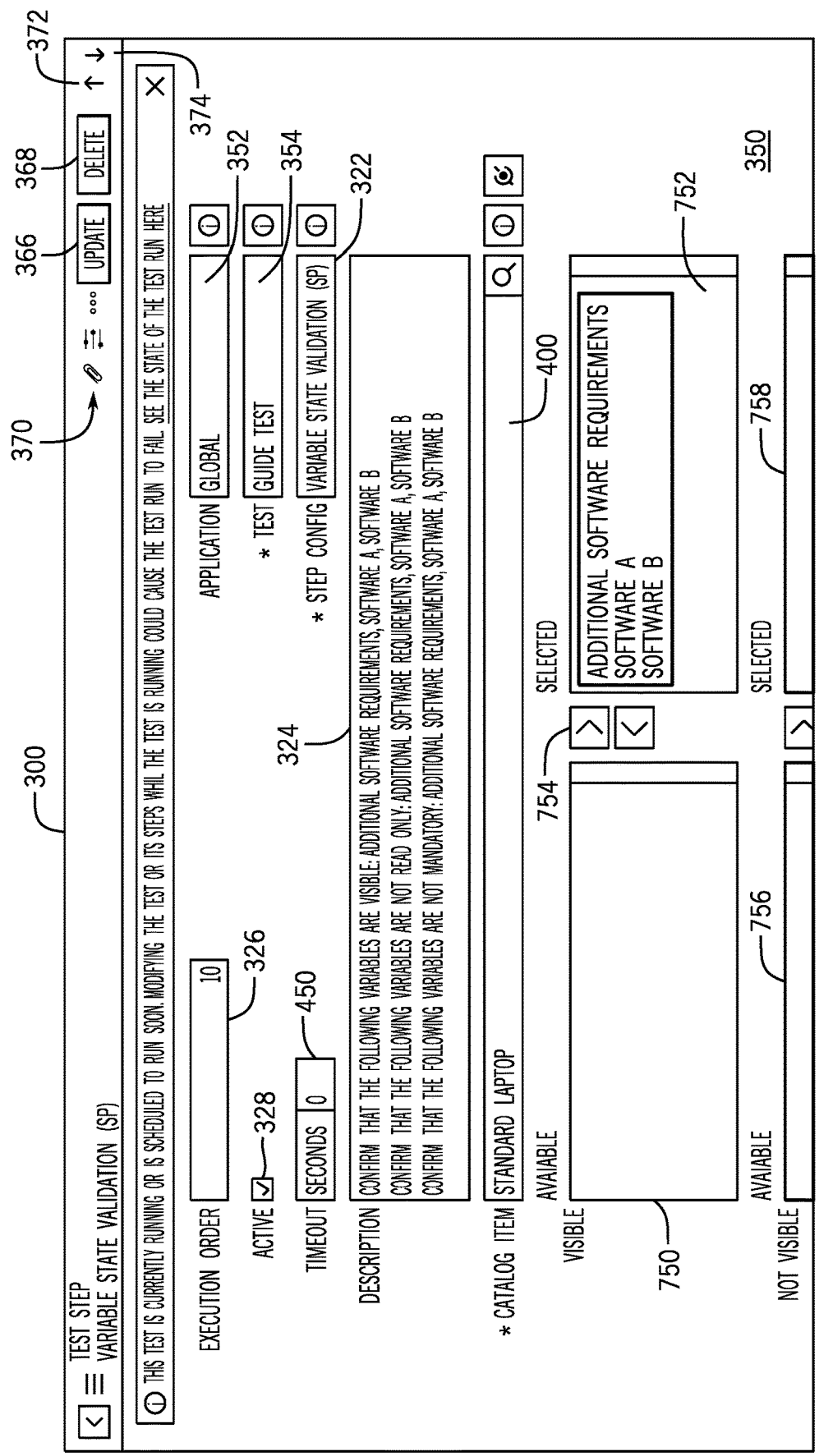
FIG. 14 is a screenshot of the GUI displaying the test step details window for a "Variable State Validation" step of the test, in accordance with aspects of the present disclosure.

When the down arrow 374 is selected, the test step details window 350 is updated to include information about the tenth test step, called "Variable State Validation", as shown in FIG. 14. As explained by the text in the description field 324, during this step, the various specified variable states are validated. For example, the test step may validate which variables are visible, which variables are not visible, which variables are read only, which variables are not read only, which variables are mandatory, and which variables are not mandatory. In the illustrated embodiment, fields for visible and not visible variables are shown. For example, the available visible variables field 750 lists the available visible variables that have not been selected and the selected visible variables field 752 lists the variables that are visible and have been selected. The arrow buttons 754 may be used to move selections between fields 750, 752. Similarly, the available not visible variables field 756 lists the available not visible variables that have not been selected and the selected not visible variables field 758 lists the variables that are not visible and have been selected. Though not shown in FIG. 14, it should be understood that by scrolling down a user may see additional fields in the test step details window 350 for variables that are read only and not read only, as well as mandatory and not mandatory.

Figure 15:
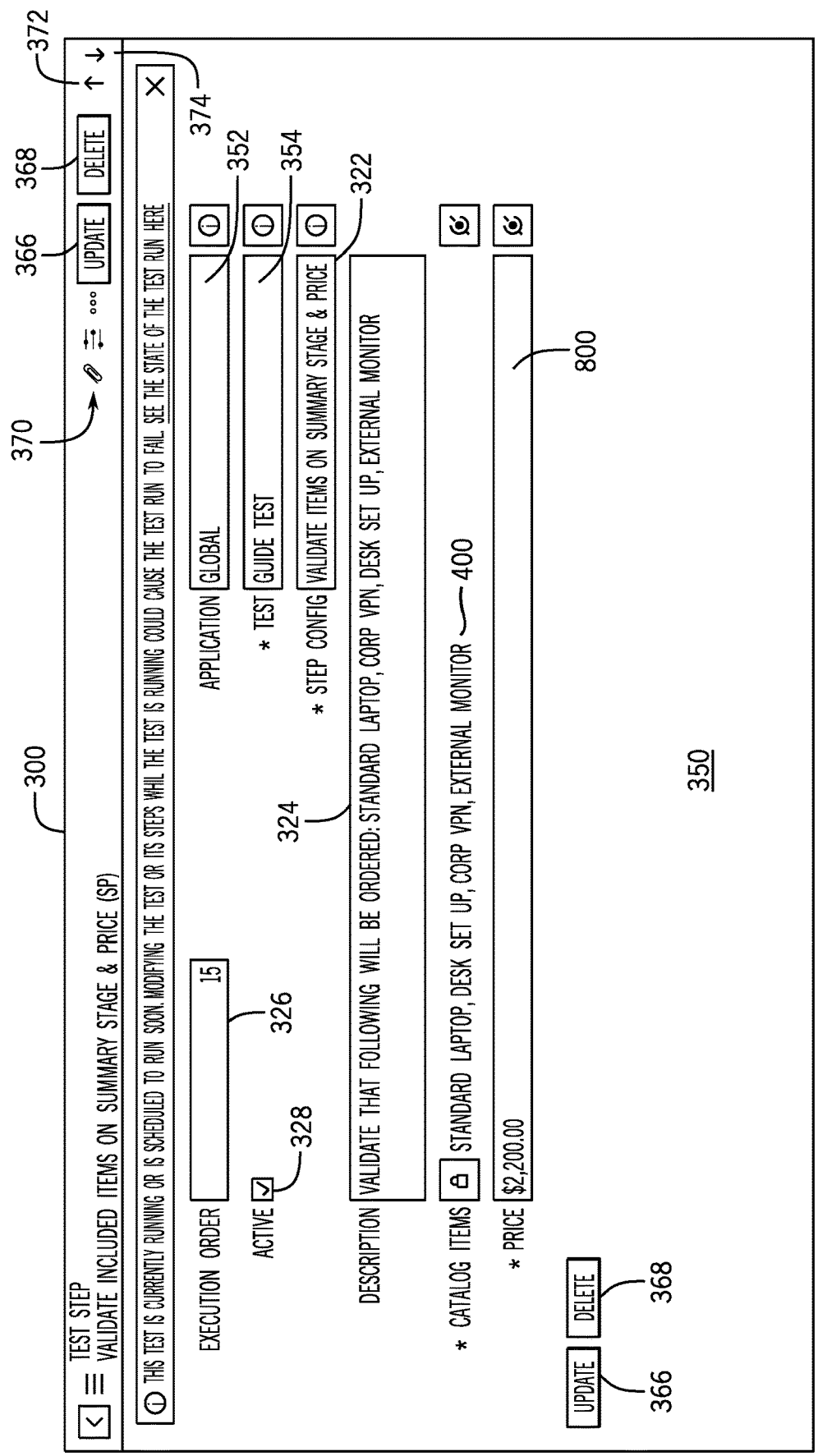
FIG. 15 is a screenshot of the GUI displaying the test step details window for a "Validate Items on Summary Stage and Price" step of the test, in accordance with aspects of the present disclosure.

When the down arrow 374 is selected, the test step details window 350 is updated to include information about the subsequent steps, which proceed in a similar fashion to go through the process of adding items to an order and submitting the order. After cycling through the subsequent steps, the user may reach the fifteenth test step, called "Validate Items on Summary Stage and Price", as shown in FIG. 15. As explained by the text in the description field 324, during this step, the test validates the items to be ordered. As illustrated, the items to be ordered are listed in the catalog items field 400. In some embodiments, this test step may also validate the total price of the items, listed in the price field, in this case $2,200.

Figure 16:
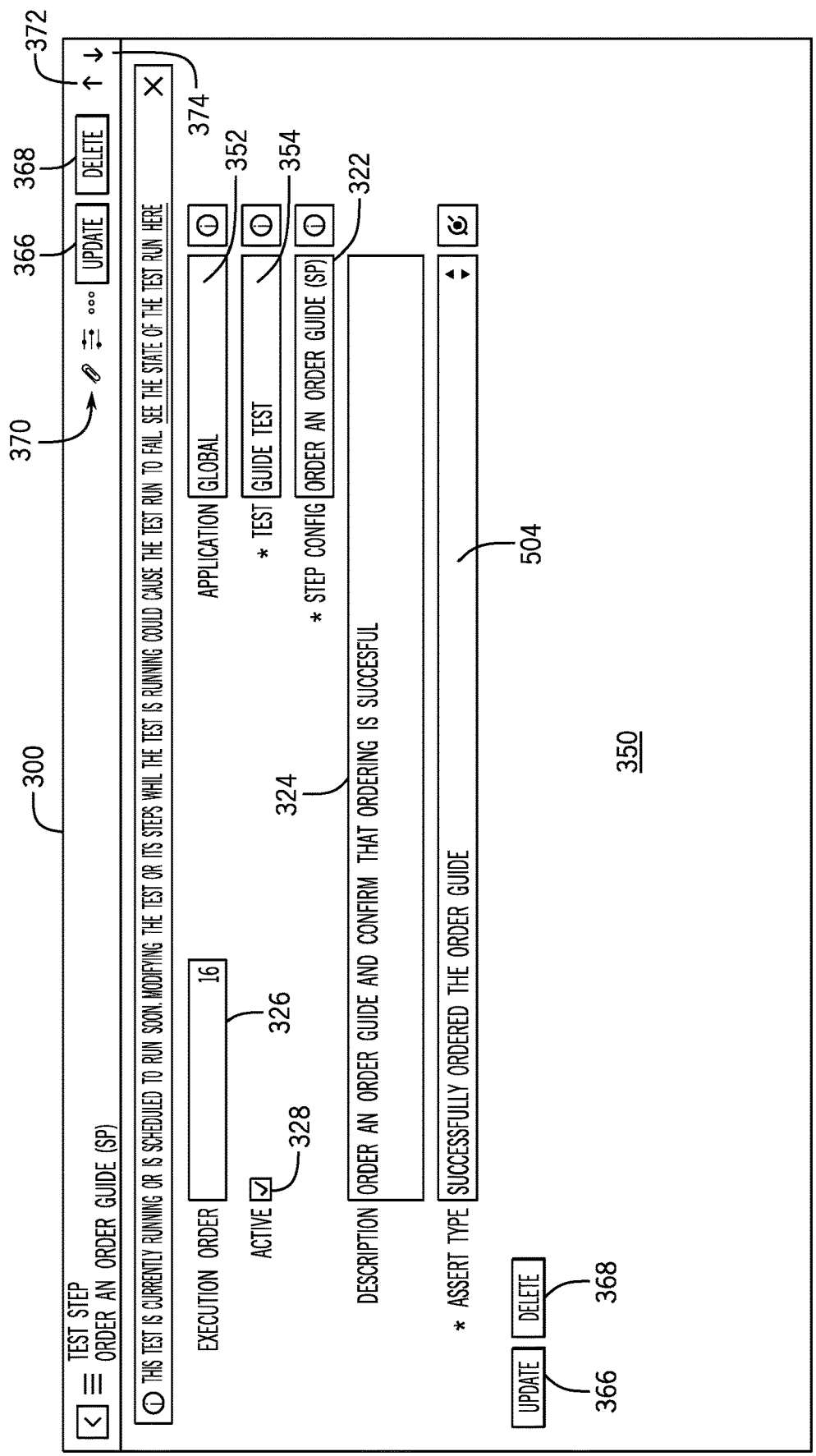
FIG. 16 is a screenshot of the GUI displaying the test step details window for an "Order an Order Guide" step of the test, in accordance with aspects of the present disclosure.

When the down arrow 374 is selected, the test step details window 350 is updated to include information about the sixteenth and final test step, called "Order an Order Guide", as shown in FIG. 16. As explained by the text in the description field 324, during this step, the order guide is ordered and it is confirmed that the order was successful. As indicated in the assert type field 504, when the order guide has been successfully ordered, the test step is successful and moves on to the next test step, or completes the test if, as in this case, this is the last step in the test.

Figure 17:
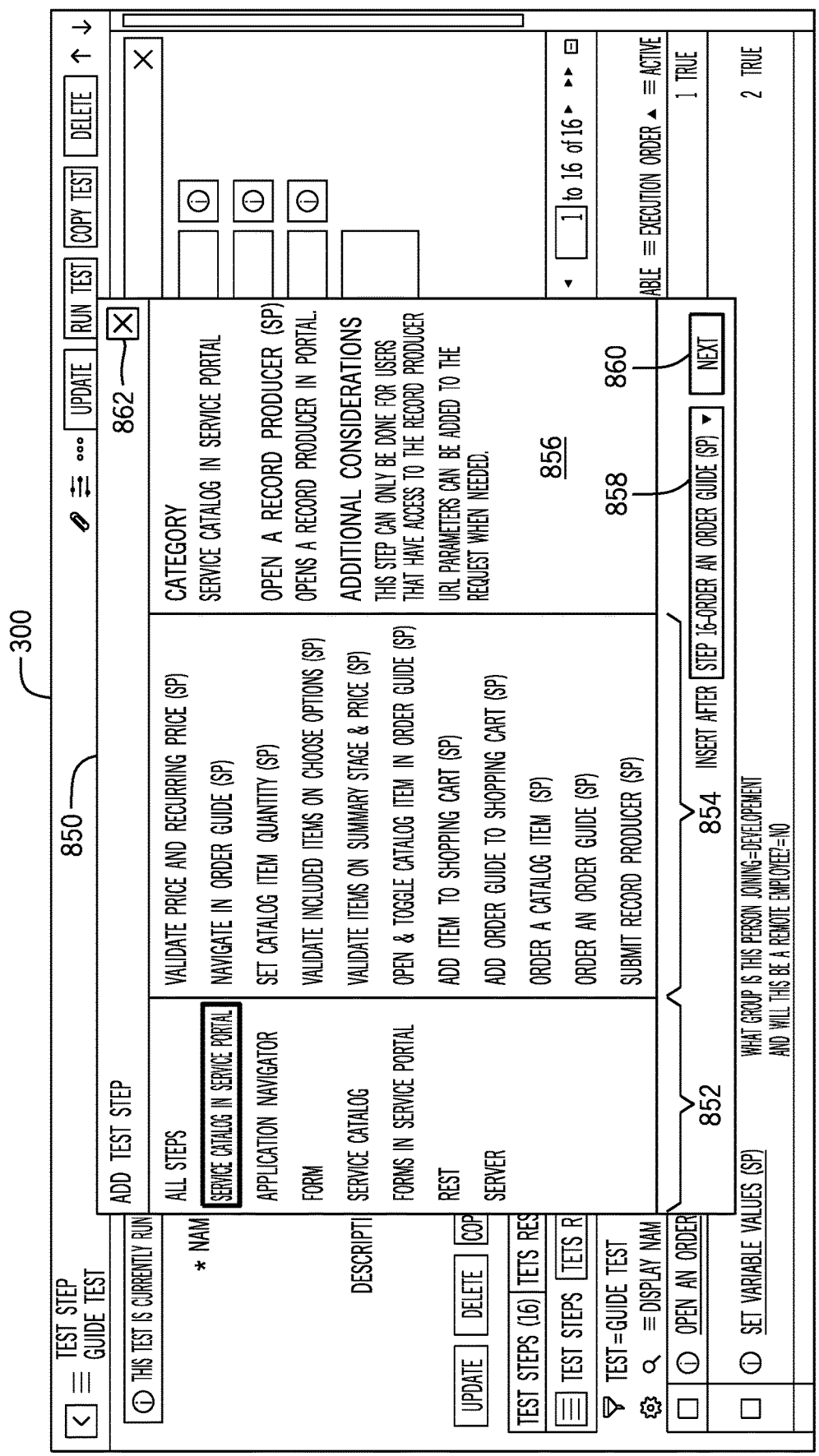
FIG. 17 is a screenshot of the GUI displaying an add test step pop up window, in accordance with aspects of the present disclosure.

Returning to FIG. 5, a user may wish to add one or more additional test steps 320 to the test. When the add test step button 308 is selected, a window may open from which the user may select a test step template. FIG. 17 is a screenshot of the GUI displaying the add test step pop up window 850. A first window 852 on the add test step pop up window 850 lists the various categories of test steps. As illustrated, these may include, for example, service catalog in service portal, application navigator, form, service catalog, forms in service portal, REST, server, etc. Once a category is selected in the first window 852, a second window 854 may be populated with a list of test steps associated with the selected category. When a test step is selected from the second window 854, a description of the selected test step may be displayed in a third window 856. The insert after field 858 indicates the step after which the new test step will be inserted. To select the preceding test step, the user may select the insert after field 858 and then select the preceding test step from a drop-down menu. The user may then select the next button 860 to insert the new test step and go to the corresponding test step details window to review and fill in the various parameters of the new test step. Alternatively, the user may select a close button 862 to close the add test step pop up window 850 without adding the new test step.

Figure 18:
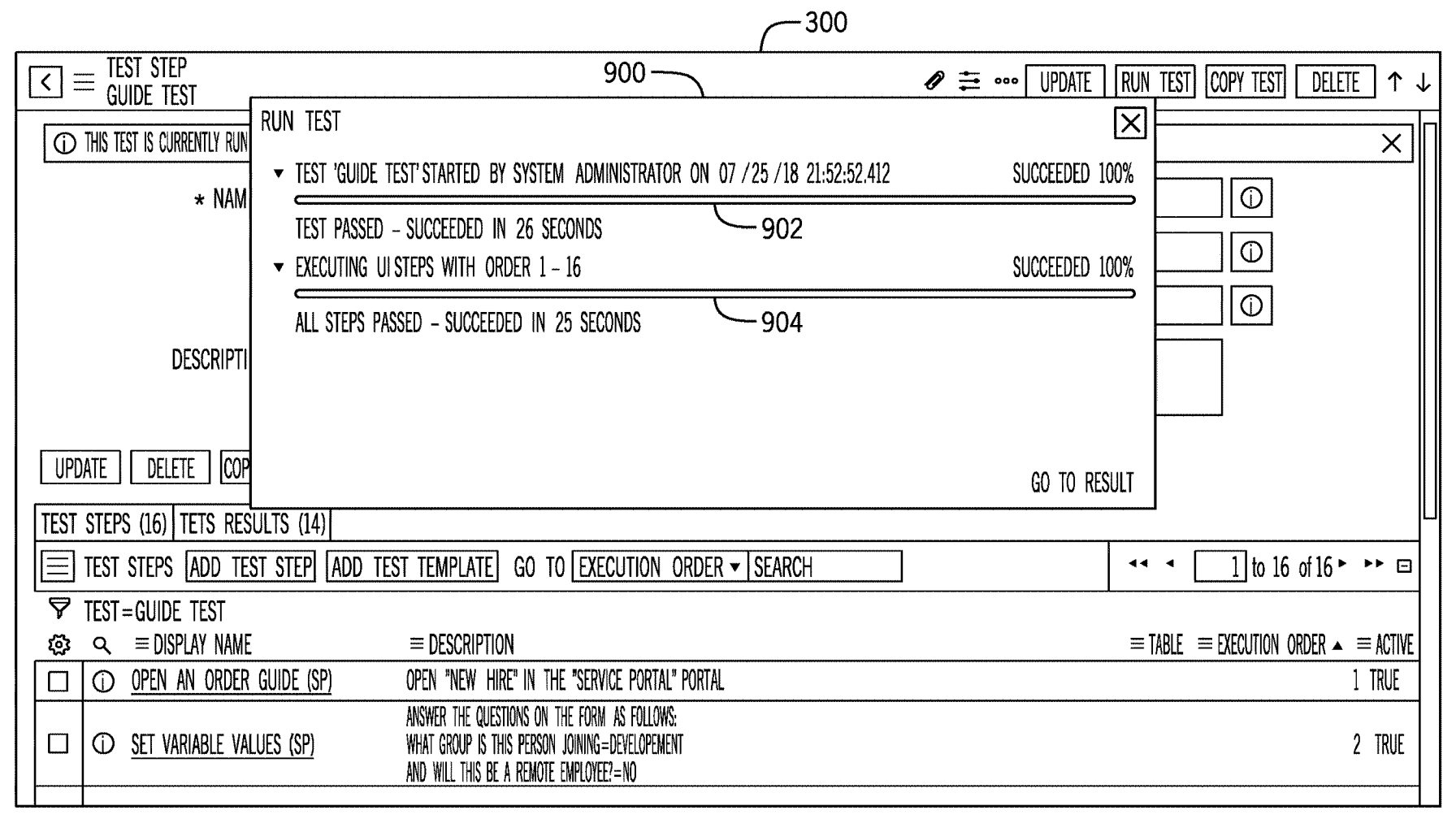

Returning to FIG. 5, when the user is ready to run the test, the user may select the run test button 330. In other embodiments the test may be run according to a schedule rather than in response to a trigger. FIG. 18 shows a run test pop up window 900 that opens within the GUI 300 when a test is running. As illustrated, the run test pop up window 900 may include first and second progress bars 902, 904. The first progress bar 902 may be indicative of the overall progress of the test, while the second progress bar 904 may be indicative of the progress of the current step of the test. The run test pop up window 900 may include additional information, such as status of test or specific steps, the current step being performed, total time elapsed for the test, time elapsed during the current step, etc. As the test runs, the test may generate results to be reviewed by the user following completion of the test.

Figure 19:
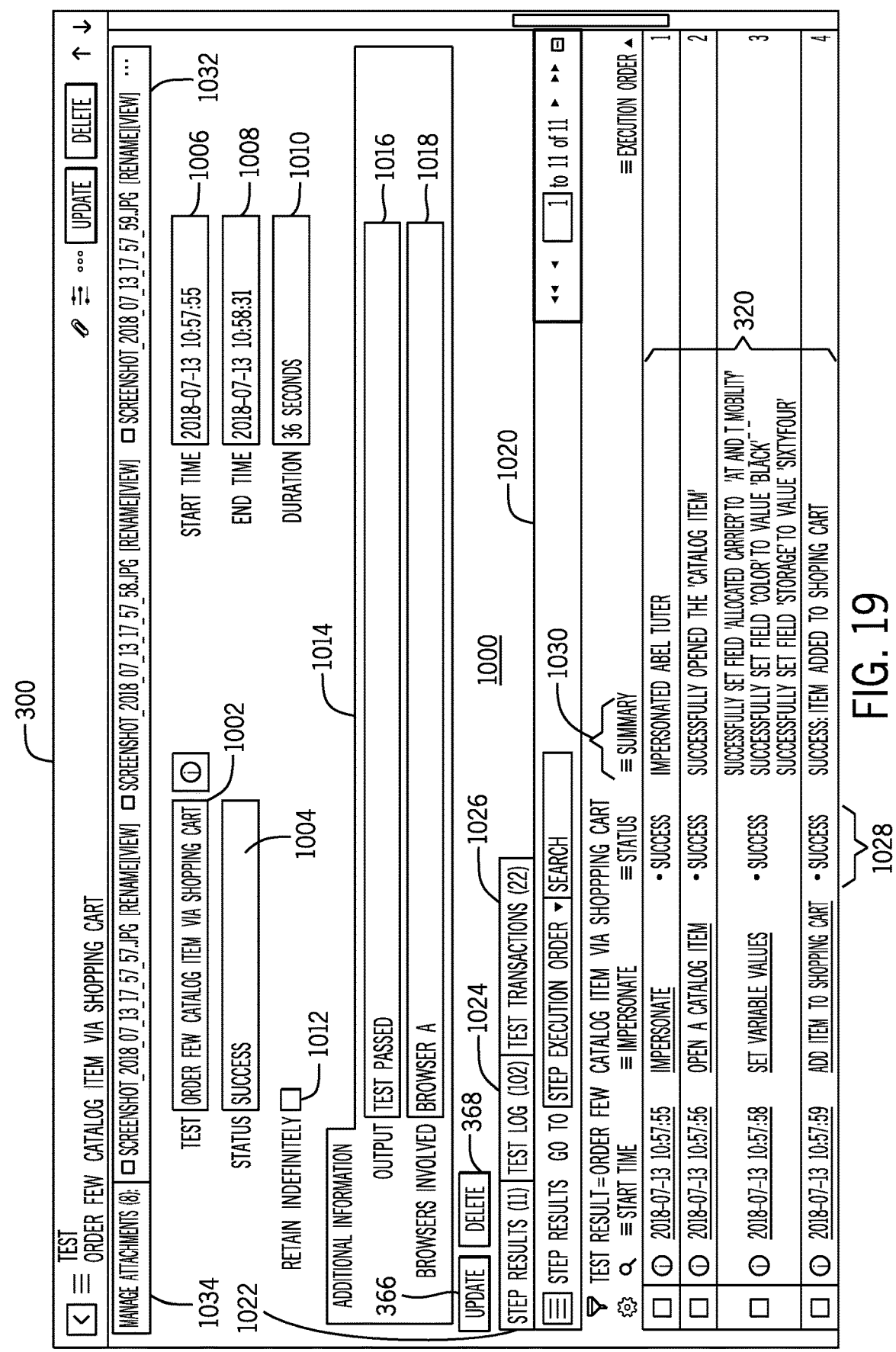
FIG. 19 is a screenshot of a results screen, in accordance with aspects of the present disclosure.

Returning to FIG. 5, the user may select the test results tab 304 to review the test results. When the test results tab 304 is selected, the GUI 300 may update to display a results screen. FIG. 19 is a screenshot of the results screen 1000. Toward the top of the results screen are data fields with basic information about the test. A test name field 1002 lists the name of the test. A test status field 1004 indicates the status of the test (e.g., success, failure, ongoing, timeout, etc.). The start time field 1006 indicates the time the test was started, while the end time field 1008 indicates the time the test was completed, stopped, timed out, or otherwise ended. The duration field 1010 indicates the duration of the test (e.g., the time elapsed between the start time and the end time). A retain test indefinitely checkbox 1012 indicates whether or not the user wishes to save the test for later use.

An additional information window 1014 provides additional information about the test. In the instant embodiment, the additional information window 1014 includes an output field 1016, which may indicate, for example, whether the test was passed, failed, not completed, timed out, etc. A browsers involved field 1018 indicates the one or more browsers used to conduct the test. In some embodiments, to test compatibility between browsers, it may be useful to run a test on multiple different browsers.

A detailed results window 1020 is disposed below the additional information window 1014. What is displayed in the detailed results window 1020 may be controlled by selecting one of a step results tab 1022, a test log tab 1024, or a test transactions tab 1026. As shown in FIG. 19, when the step results tab 1022 is selected, the detailed results window 1020 displays results of each step within a test. For example, the detailed results window 1020 may list the various test steps 320. The listing for each test step 320 may include a status field 1028 and a summary field 1030. The status field 1028 may indicate whether the test step was successful, failed, stopped, timed out, etc. The summary field 1030 may provide a summary of which actions were taken during the test step and whether those actions were successful.

As previously discussed, as the test is being performed, screenshots may be generated. The screenshots may include, for example, images of the service catalog user interface as a user would complete the steps of the test. Across the top of the results screen 1000 is an attachment banner 1032 that lists the files of the various screenshots generated. The user may select a manage attachments button 1034 within the attachment banner 1032 to see all of the attachments generated for a test and manage those attachments.

Figure 20:
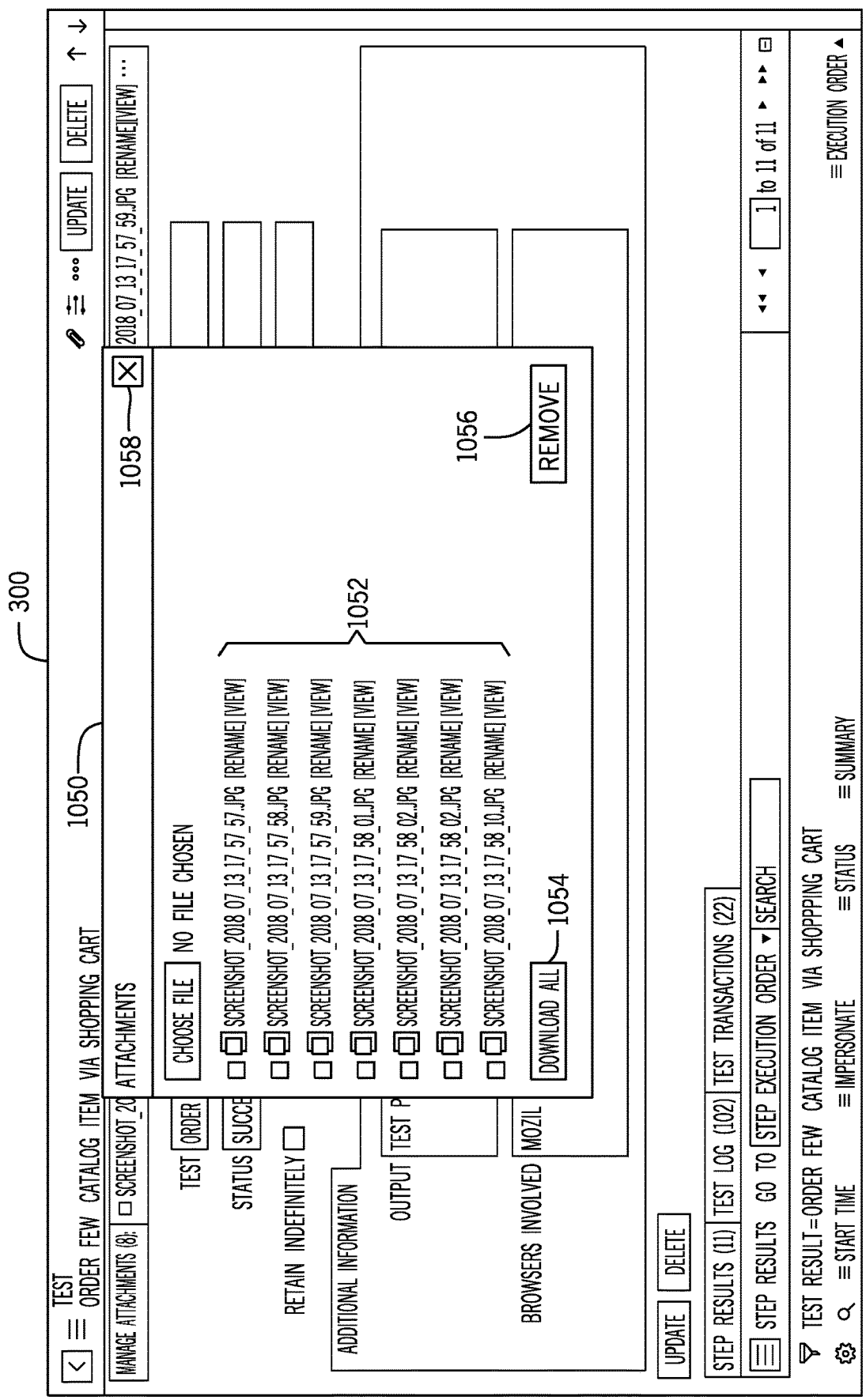
FIG. 20 is a screenshot of the GUI displaying a manage attachments pop up window that opens when a manage attachments button is selected, in accordance with aspects of the present disclosure.

FIG. 20 shows a manage attachments pop up window 1050 that opens when a user selects the manage attachments button 1034. As shown, the manage attachments pop up window 1050 includes a listing of the various attachments 1052 (e.g., screenshots generated during the test). However, it should be understood that in some embodiments, the test may generate attachments other than screenshots (e.g., spread sheets, text files, etc.). From the manage attachments pop up window 1050, the user may select one or more attachments, rename attachments, view attachments, etc. A download all button 1054, when selected, triggers a download of all of the attachments. A remove button 1056 removes one or more selected attachments from the listing 1052. A close button 1058 closes the manage attachments pop up window 1050.

Figure 21:
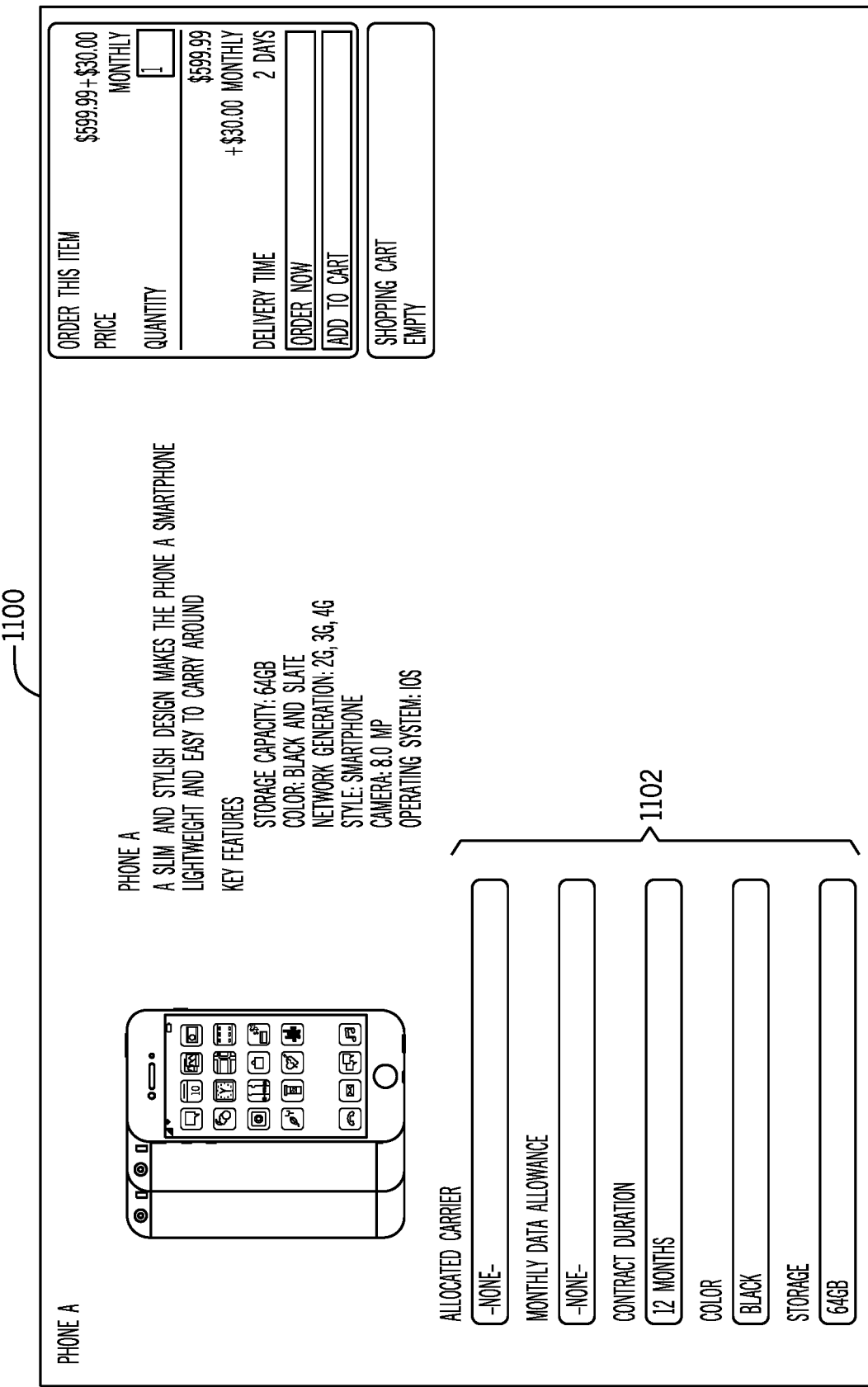
FIG. 21 is a sample screenshot that would be captured during the test, in accordance with aspects of the present disclosure.

FIG. 21 is a sample screenshot 1100 captured during a test step. In the instant embodiment, the screenshot is of a service catalog user interface for a mobile phone. However, it should be understood, that similar screenshots may be generated for any item listed in the service catalog, or any screen displayed within the service catalog user interface. As shown, the sample screenshot includes multiple variables (i.e., allocated carrier, monthly data allowance, contract duration, color, and storage). Some of the variables have been filled in, while others have not, indicating that the screenshot was taken in the middle of a test while the variables were being filled in.

FIG. 22 is a flow chart of a process 1150 for testing elements of a service catalog. At block 1152, a library of test step templates may be provided to the user. The test steps may include, for example, frequently used steps in a test (e.g., search for catalog item, fill in variables for catalog item, add catalog item to cart, submit order, etc.). In some embodiments, the library may also include test templates. Test templates may include, for example, multiple test steps that are frequently used in combination. Each of the test steps may include one or more underlying scripts that are executed in order to run the test step.

At block 1154, inputs are received from the user selecting a test step to be used. A GUI may then be presented to the user in which the user provides various information about how the test step is to be performed (e.g., identifying the catalog item, specifying variables, specifying quantities, validating price, etc.). At block 1156 these inputs provided by the user are received. At block 1158 the underlying one or more scripts of the test step are updated based on the inputs provided by the user to run the test step in the way specified by the user. At block 1160, inputs are received combining the test step with one or more other test steps.

At block 1162, the test is run. The test may be manually triggered by the user, or run on a schedule. Running the test may include, for example, running the underlying scripts for each test step within the test, in the specified order. At block 1164, results are generated for the test. As previously discussed, the results may include, for example, screenshots 1052, a results table 1166 indicating the results of each test step, and/or a results log 1168. At block 1170 failed steps may be flagged for emphasis when reviewed by the user. At block 1172, the failed steps are presented to the user for review.

The disclosed techniques allow a user to design tests for a service catalog before customizations or updates are implemented without having to write and/or edit the underlying scripts run to execute the tests. Specifically, a library of test step templates is populated and provided to the user. The test steps may cover frequently used steps performed when testing a service catalog, such as locating an item within the service catalog, validating available parameters for the item, setting parameters for the item, validating price for the item, submitting an order, etc. The test step templates in the library may be selected by the user and edited to fill in specific parameters that specify the actions to be taken during execution of the test step. The test step may then be combined with other test steps to form a test. In some embodiments, the library may include test templates made up of frequently used sequences of individual test steps. Once a test has been designed, the test may be run, either manually triggered by a user, or according to a schedule. The system may then run through the steps of the test, as specified by the user, by running the underlying scripts. As the test is run, results may be generated. The results may include, for example, screenshots of the service catalog user interface as the various steps are being performed, a table of results for each step, which may include a status and a summary, and/or a test log. In some embodiments, failed test steps may be flagged so as to call the user's attention to these steps for remedial action.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a hosted instance hosted by a datacenter, wherein the hosted instance is configured to communicate with a client instance generated for a client network, the hosted instance configured to perform operations comprising:
receiving, from the client instance, inputs specifying one or more first actions to be taken within an online service catalog, accessible by the client instance, for execution of a first test step of a plurality of test steps of an automated testing framework;
executing the first test step, comprising performing the one or more first actions within the online service catalog;
generating one or more screenshots capturing a user interface of the online service catalog as the one or more first actions are performed;
generating a results table comprising one or more results of performing the one or more first actions within the online service catalog;
providing the one or more screenshots and the results table for review via a graphical user interface; and
providing, via the graphical user interface, an indication of which of the plurality of test steps of the automated testing framework, if any, were not successfully completed.

2. The system of claim 1, the operations comprising: updating a first script associated with the first step of the automated testing framework based on the received inputs specifying the one or more first actions to be taken within the service catalog.

3. The system of claim 2, wherein executing the first test step comprises running the first script associated with the first step of the automated testing framework.

4. The system of claim 1, the operations comprising:
receiving inputs specifying one or more second actions to be taken within the online service catalog for execution of a second test step of the plurality of steps of the automated testing framework; and
executing the second test step, comprising performing the one or more second actions within the online service catalog.

5. A system, comprising:
a non-transitory memory; and
one or more hardware processors configured to read instructions from the non-transitory memory to perform operations comprising:
receiving inputs specifying one or more first actions to be taken within an online service catalog for execution of a first test step of a plurality of test steps of an automated testing framework;
executing the first test step, comprising performing the one or more first actions within the online service catalog;
generating one or more screenshots capturing a user interface of the online service catalog as the one or more first actions are performed;
generating a results table comprising one or more results of performing the one or more first actions within the online service catalog;
providing the one or more screenshots and the results table for review via a graphical user interface; and
providing, via the graphical user interface, an indication of which of the plurality of test steps of the automated testing framework, if any, were not successfully completed.

6. The system of claim 5, the operations comprising: updating a first script associated with the first step of the automated testing framework based on the received inputs specifying the one or more first actions to be taken within the service catalog.

7. The system of claim 6, wherein executing the first test step comprises running the first script associated with the first step of the automated testing framework.

8. The system of claim 5, the operations comprising:
receiving inputs specifying one or more second actions to be taken within the online service catalog for execution of a second test step of the plurality of steps of the automated testing framework; and
executing the second test step, comprising performing the one or more second actions within the online service catalog.

9. The system of claim 5, the operations comprising presenting a test step template library comprising a plurality of test step templates, wherein each of the plurality of test step templates in the library includes at least one unspecified variable to be specified before the respective test step template can be executed as a test step.

10. The system of claim 9, wherein the test step template library comprises one or more test templates, each comprising two or more of the plurality of test step templates.

11. The system of claim 5, wherein the automated testing framework for the service catalog is accessible via a service portal.

12. The system of claim 5, the operations comprising generating a test log based on the one or more results of performing the one or more first actions within the online service catalog.

13. A method, comprising:
receiving inputs specifying one or more first actions to be taken within an online service catalog for execution of a first test step of a plurality of test steps of an automated testing framework;
executing the first test step, comprising performing the one or more first actions within the online service catalog;
generating one or more screenshots capturing a user interface of the online service catalog as the one or more first actions are performed;
generating a results table comprising one or more results of performing the one or more first actions within the online service catalog;
providing the one or more screenshots and the results table for review via a graphical user interface; and
providing, via the graphical user interface, an indication of which of the plurality of test steps of the automated testing framework, if any, were not successfully completed.

14. The method of claim 13, comprising updating a first script associated with the first step of the automated testing framework based on the received inputs specifying the one or more first actions to be taken within the service catalog.

15. The method of claim 13, comprising:
receiving inputs specifying one or more second actions to be taken within the online service catalog for execution of a second test step of the plurality of test steps of the automated testing framework; and
executing the second test step, comprising performing the one or more second actions within the online service catalog.

16. The method of claim 13, comprising presenting a test step template library comprising a plurality of test step templates, wherein each of the plurality of test step templates in the library includes at least one unspecified variable to be specified before the respective test step template can be executed as a test step.

17. The method of claim 16, wherein the test step template library comprises one or more test templates, each comprising two or more of the plurality of test step templates.

18. The method of claim 13, wherein the one or more first actions comprise locating an item within a service catalog.

19. The method of claim 13, wherein the one or more first actions comprise:
specifying one or more variables for an item within the service catalog;
specifying a quantity; and
submitting an order for the item.

20. The method of claim 13, wherein the one or more first actions comprise validating one or more options for one or more respective variables for an item and validating a price of the item.

* * * * *